US012583677B2

(12) United States Patent
Isobata

(10) Patent No.: US 12,583,677 B2
(45) Date of Patent: Mar. 24, 2026

(54) COMPONENT MANAGEMENT DEVICE AND COMPONENT MANAGEMENT METHOD

(71) Applicant: Panasonic Intellectual Property Management Co., Ltd., Osaka (JP)

(72) Inventor: Yoshinori Isobata, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 868 days.

(21) Appl. No.: 17/904,848

(22) PCT Filed: Nov. 19, 2020

(86) PCT No.: PCT/JP2020/043171
§ 371 (c)(1),
(2) Date: Aug. 23, 2022

(87) PCT Pub. No.: WO2021/192408
PCT Pub. Date: Sep. 30, 2021

(65) Prior Publication Data
US 2023/0112775 A1      Apr. 13, 2023

(30) Foreign Application Priority Data
Mar. 25, 2020      (JP) ................................. 2020-053538

(51) Int. Cl.
*B65G 1/137* (2006.01)
*B65G 9/00* (2006.01)

(52) U.S. Cl.
CPC ............. *B65G 1/137* (2013.01); *B65G 9/002* (2013.01)

(58) Field of Classification Search
CPC ......... B65G 1/137; B65G 9/002; Y02P 90/30; H05K 13/0419; H05K 13/086; H05K 13/021
See application file for complete search history.

(56) References Cited

U.S. PATENT DOCUMENTS 10,694,646 B2 *   6/2020   Jacobsson .......... H05K 13/0084
10,956,857 B2 *   3/2021   Jacobsson ........... G06Q 10/087
(Continued)

FOREIGN PATENT DOCUMENTS

CN        108027909 A   *   5/2018   ............. B66F 9/0755
EP           3471526 A1  *   4/2019   ............. H05K 13/02
(Continued)

OTHER PUBLICATIONS

International Search Report of PCT application No. PCT/JP2020/043171 dated Jan. 19, 2021.
(Continued)

*Primary Examiner* — Jacob S. Scott
*Assistant Examiner* — Erin Morris
(74) *Attorney, Agent, or Firm* — McDonald Hopkins LLC

(57) ABSTRACT

Provided are a roll body extractor that extracts roll bodies from reels and store the roll bodies in cases having radio tags, respectively, and a storage warehouse that includes a plurality of storage positions for storing the cases storing the roll bodies. Furthermore, provided are a reading unit that acquires component information, an identification information generator that generates identification information for identifying a component, a writing unit that writes the component information and the identification information in the radio tag, and a contactless reader that reads the identification information written in the radio tag. Further, the component information written in the radio tag and the identification information are stored in association with each other, and storage position information generated by specifying the storage position and the identification information read by the contactless reader are stored in association with each other.

7 Claims, 17 Drawing Sheets

(56)            References Cited

U.S. PATENT DOCUMENTS

| | | | |
|---|---|---|---|
| 2018/0186571 A1 | 7/2018 | Shimizu et al. | |
| 2019/0150335 A1* | 5/2019 | Kato ................. | H05K 13/0061 |
| | | | 29/832 |

FOREIGN PATENT DOCUMENTS

| | | | | | |
|---|---|---|---|---|---|
| EP | 4120813 | A1 * | 1/2023 | ........... | H05K 13/087 |
| JP | 2001127487 | A * | 5/2001 | | |
| JP | 2019-091771 | | 6/2019 | | |
| JP | 2019091771 | A * | 6/2019 | | |
| WO | WO-2021106119 | A1 * | 6/2021 | ........... | H05K 13/086 |

OTHER PUBLICATIONS

English Translation of Chinese Search Report dated May 20, 2024 for the related Chinese Patent Application No. 202080097789.0.

* cited by examiner

FIG. 17

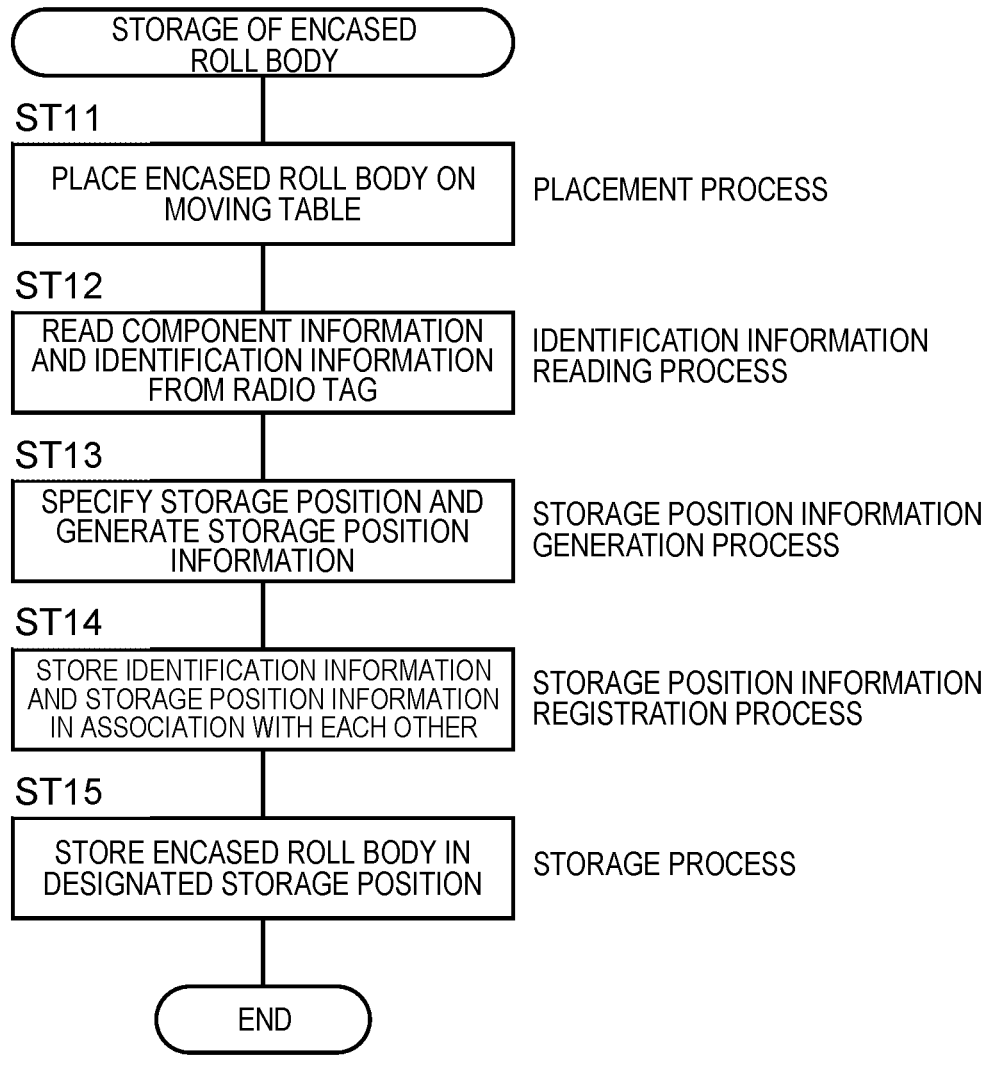

STORAGE OF ENCASED
ROLL BODY

ST11

PLACE ENCASED ROLL BODY ON
MOVING TABLE

PLACEMENT PROCESS

ST12

READ COMPONENT INFORMATION
AND IDENTIFICATION INFORMATION
FROM RADIO TAG

IDENTIFICATION INFORMATION
READING PROCESS

ST13

SPECIFY STORAGE POSITION AND
GENERATE STORAGE POSITION
INFORMATION

STORAGE POSITION INFORMATION
GENERATION PROCESS

ST14

STORE IDENTIFICATION INFORMATION
AND STORAGE POSITION INFORMATION
IN ASSOCIATION WITH EACH OTHER

STORAGE POSITION INFORMATION
REGISTRATION PROCESS

ST15

STORE ENCASED ROLL BODY IN
DESIGNATED STORAGE POSITION

STORAGE PROCESS

END

COMPONENT MANAGEMENT DEVICE AND COMPONENT MANAGEMENT METHOD

TECHNICAL FIELD

The present disclosure relates to a component management device and a component management method for managing components held by a roll body of a carrier tape housed in a case.

BACKGROUND ART

Conventionally, component management devices for facilitating replenishment and procurement of components on the basis of production plan data in manufacturing lines of mounting boards or the like have been known (see, for example, PTL 1 below).

In a component management device described in PTL 1, a carrier tape housing components can be stored and managed in units of reels, and operations such as stocking and take-out of the components (reels) can be automatically performed. At this time, the components are housed in a dedicated tray, and an operator attaches the reel to the tray on a workbench at the time of stocking the components, and detaches the reel from the tray on the workbench at the time of taking out the components.

CITATION LIST

Patent Literature

PTL 1: Unexamined Japanese Patent Publication No. 2019-91771

SUMMARY OF THE INVENTION

Therefore, an object of the present disclosure is to provide a component management device and a component management method capable of stocking and taking out components easily and efficiently.

A component management device according to the present disclosure includes: a roll body extractor that extracts a roll body from a holding body, which holds a carrier tape storing a component in a state of the roll body, and stores the roll body in a case having a storage unit; a component information acquisition unit that acquires component information which is information on the component; an identification information generator that generates identification information which is used to discriminate the component from the other components housed in the other cases; a writing unit that writes the component information and the identification information into the storage unit; a storage warehouse that includes a storage including a plurality of storage positions for storing the cases housing the roll bodies, a case transfer mechanism for taking in and out the cases from the storage, and an identification information reading unit that reads the identification information written in the storage unit; a first information manager that stores the component information and the identification information written in the storage unit in association with each other; a storage position information generator that specifies the storage position and generates storage position information; and a second information manager that stores the storage position information generated by the storage position information generator and the identification information read by the identification information reading unit in association with each other.

A component management method according to the present disclosure is a component management method for a component mounting system including: a roll body extractor that extracts a roll body from a holding body, which holds a carrier tape storing a component in a state of the roll body and stores the roll body in a case having a storage unit; a storage warehouse that includes a storage unit including a plurality of storage positions for storing the cases storing the roll bodies and a case transfer mechanism for taking in and out the cases from the storage; a first information manager; and a second information manager, and includes: a component information acquisition process of acquiring component information that is information on the component; an identification information generation process of generating identification information which is used to discriminate the component from the other components housed in the other cases; a writing process of writing the component information and the identification information into the storage unit; a component information registration process of storing the component information and the identification information written in the storage unit in the first information manager in association with each other; an identification information reading process of reading the identification information written in the storage unit; a storage position information generation process of specifying the storage position and generating storage position information; and a storage position information registration process of storing the storage position information generated in the storage position information generation process and the identification information read in the identification information reading process in the second information manager in association with each other.

According to the present disclosure, it is possible to easily and efficiently stock and take out the components.

BRIEF DESCRIPTION OF THE DRAWINGS

FIG. 17 is a flowchart illustrating a flow of work of storing the encased roll body in the storage warehouse according to the exemplary embodiment of the present disclosure.

DESCRIPTION OF EMBODIMENT

Prior to describing an exemplary embodiment of the present disclosure, a problem of a conventional device will be briefly described.

As in a component management device described in PTL 1, there is a problem that it takes time and effort to perform work of attaching or detaching a component (reel) to or from a tray every time the component is stocked or taken out. Further, there is a demand for a component management device that can stock or take out a component more easily and efficiently.

Figure 1:
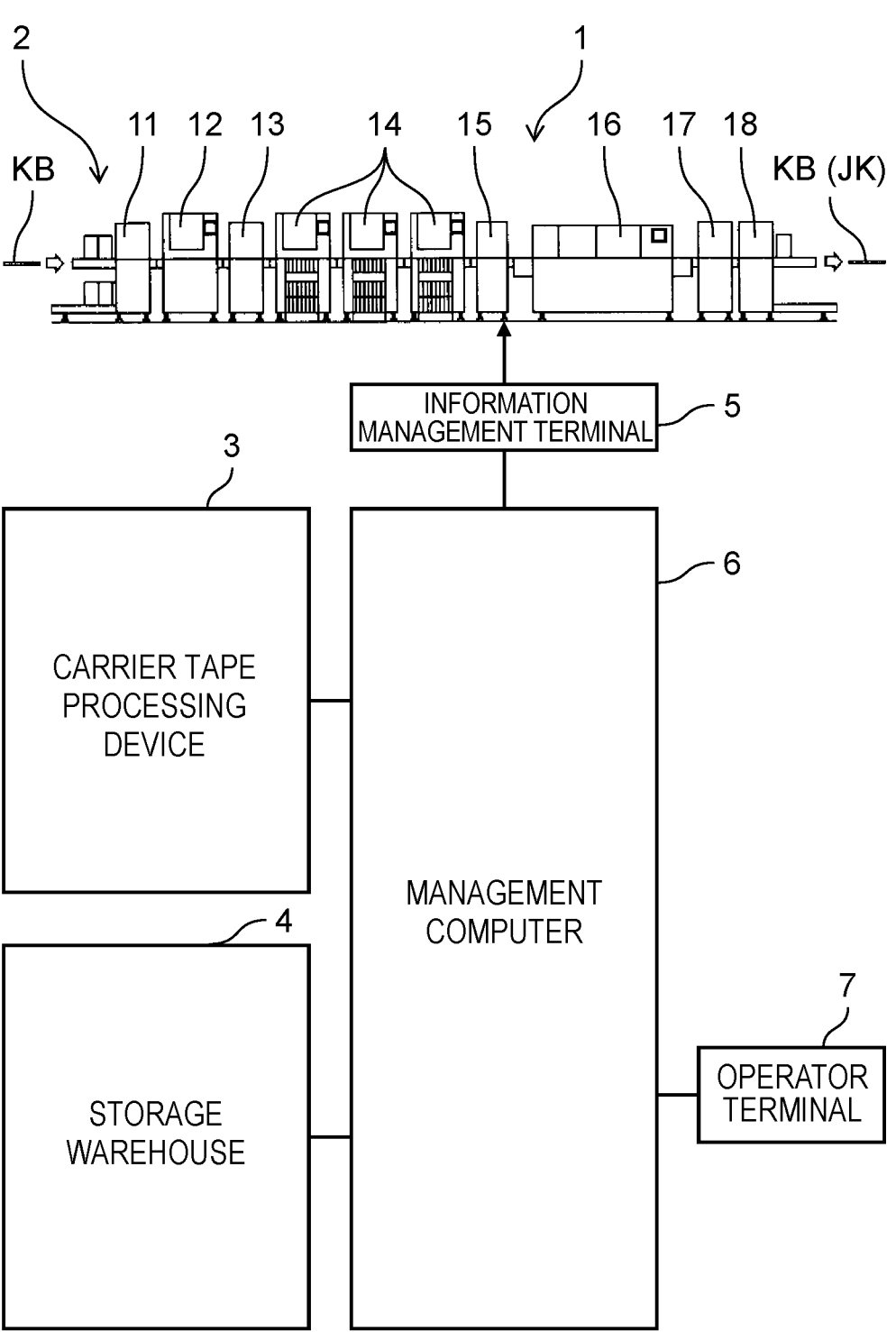
FIG. 1 is a schematic configuration diagram of a component mounting system according to an exemplary embodiment of the present disclosure.

Hereinafter, the exemplary embodiment of the present disclosure will be described with reference to the drawings. FIG. 1 is a configuration diagram of component mounting system 1 including a component management device according to the exemplary embodiment of the present disclosure. Component mounting system 1 includes manufacturing line 2, carrier tape processing device 3 related to supply of components to be supplied to manufacturing line 2, and storage warehouse 4 related to storage and management of components. Manufacturing line 2 manufactures mounting board JK in which components are mounted on board KB by performing work while receiving and transferring board KB among a plurality of devices connected in series.

In FIG. 1, manufacturing line 2 is connected to management computer 6 through information management terminal 5. Management computer 6 manages an operation of each of devices constituting manufacturing line 2. In addition, carrier tape processing device 3 and storage warehouse 4 are also connected to management computer 6 as illustrated in FIG. 1. Management computer 6 also manages operations of carrier tape processing device 3 and storage warehouse 4. As illustrated in FIG. 1, operator terminal 7 is connected to management computer 6, and an operator of component mounting system 1 can perform various operation inputs from operator terminal 7 to component mounting system 1.

First, manufacturing line 2 will be described. In FIG. 1, manufacturing line 2 includes board supply device 11, printing device 12, post-printing inspection device 13, a plurality of component mounting devices 14, post-mounting inspection device 15, reflow device 16, final inspection device 17, and board collection device 18.

Board supply device 11 sequentially supplies boards KB to printing device 12 on the downstream side. Printing device 12 carries in board KB supplied from board supply device 11, applies paste solder to an electrode formed on the surface of board KB, and carries out board KB to post-printing inspection device 13 on the downstream side. Post-printing inspection device 13 carries in board KB carried out from printing device 12, performs inspection by observing whether there is a place where the solder is applied in a defective state using a camera, and then, carries out board KB to component mounting device 14 on the downstream side.

Each of component mounting devices 14 mounts a component on board KB carried in from the upstream side and carries out board KB to the downstream side. Component mounting device 14 located on the most downstream side carries out board KB to post-mounting inspection device 15 located on the downstream side. Component mounting device 14 will be described later.

Post-mounting inspection device 15 carries in board KB, carried out from component mounting device 14 located on the most downstream side, inspects board KB by observing whether there is a place where the component is mounted in a defective state using a camera, and then, carries out board KB to reflow device 16 on the downstream side. Reflow device 16 carries in board KB carried out from post-mounting inspection device 15, and causes board KB to pass through a reflow furnace to melt and solidify the solder, thereby bonding the component to the electrode. Final inspection device 17 carries in board KB that has passed through reflow device 16, performs inspection by observing a bonding state of the component with respect to the electrode using a camera, and then, carries out board KB to board collection device 18 on the downstream side. Board collection device 18 receives and collects board KB carried out from final inspection device 17.

Figure 2:
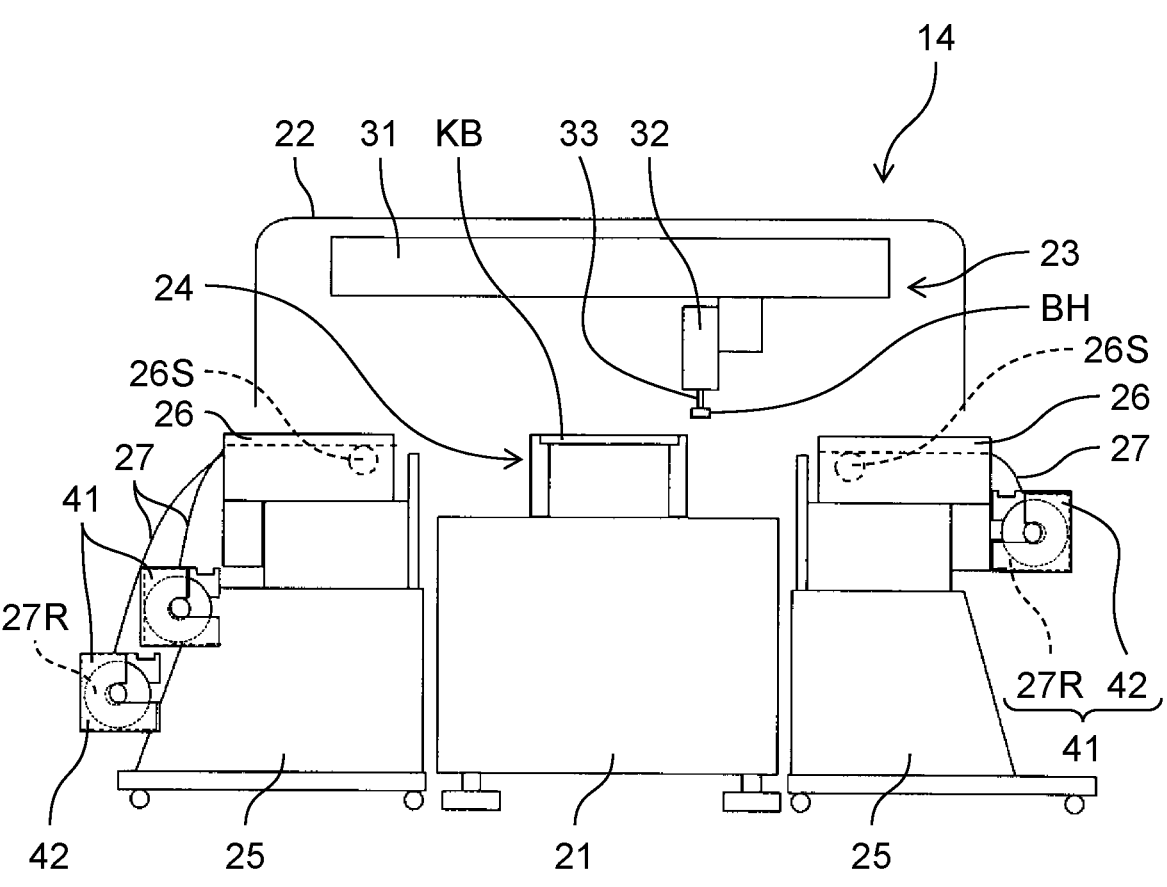
FIG. 2 is a side view of a component mounting device included in the component mounting system according to the exemplary embodiment of the present disclosure.

Next, component mounting device 14 will be described with reference to FIG. 2. In FIG. 2, base cover 22 is provided on base 21 of component mounting device 14, and board conveyance path 24 that conveys board KB in the horizontal direction is provided in work space 23 between base 21 and base cover 22.

Feeder carriages 25 are connected to positions on both sides of board conveyance path 24 on base 21. A plurality of component supply units 26 is attached to each of feeder carriages 25. Here, component supply unit 26 is a tape feeder, and supplies components BH one by one to a predetermined component supply position by conveying carrier tape 27 by sprocket 26S.

In FIG. 2, mounting head 32 that is moved in the horizontal plane by head moving mechanism 31 is provided in work space 23. Mounting head 32 is provided with component suction nozzle 33 extending downward. Component BH supplied by component supply unit 26 is sucked to a lower end of component suction nozzle 33.

When board conveyance path 24 carries in board KB from the upstream side and positions board KB, each of component mounting devices 14 causes mounting head 32 to repeatedly perform a mounting turn while causing component supply unit 26 to supply component BH. In one mounting turn, mounting head 32 performs an operation of sucking and picking up component BH supplied by component supply unit 26 and an operation of mounting component BH at a predetermined component placement position on board KB in this order. When all of components BH to be mounted on board KB are mounted by repeatedly performing the mounting turns on mounting head 32, board conveyance path 24 is activated to carry out board KB to the downstream side.

Here, carrier tape 27 used by component mounting device 14 for supplying component BH is fed out from encased roll body 41 in the present exemplary embodiment. Here, "encased roll body 41" refers to roll body 27R in which carrier tape 27 is rolled and housed in case 42 (see also FIG. 3). Encased roll body 41 is different from reel-equipped roll body 43 (FIG. 4) that is conventionally used. Here, "reel-equipped roll body 43" refers to roll body 27R held by reel 44.

Figure 5:
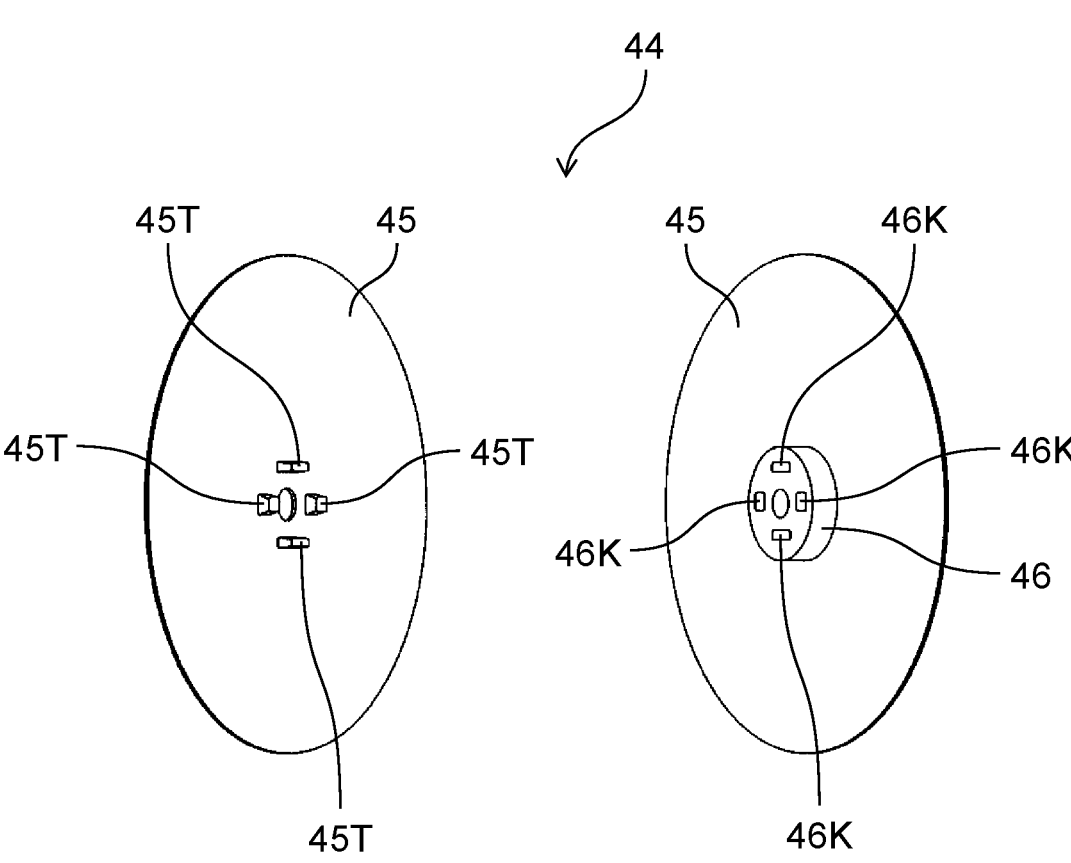
FIG. 5 is an exploded view of a reel of the reel-equipped roll body used when a carrier tape processing device according to the exemplary embodiment of the present disclosure manufactures the encased roll body.

In the present exemplary embodiment, reel 44 of reel-equipped roll body 43 is assumed to have two side plates 45 and winding core 46 disposed between two side plates 45 as illustrated in FIG. 5. In the present exemplary embodiment, it is assumed that winding core 46 is coupled to one side plate 45. Further, it is assumed to adopt a configuration in which a plurality of recesses 46K provided in winding core 46 of one side plate 45 and a plurality of protrusions 45T provided on another side plate 45 are fitted to each other to connect two side plates 45. Therefore, when reel 44 is disassembled in the present exemplary embodiment, reel 44 is divided into two parts including one side plate 45 and another side plate 45.

Figure 6A:
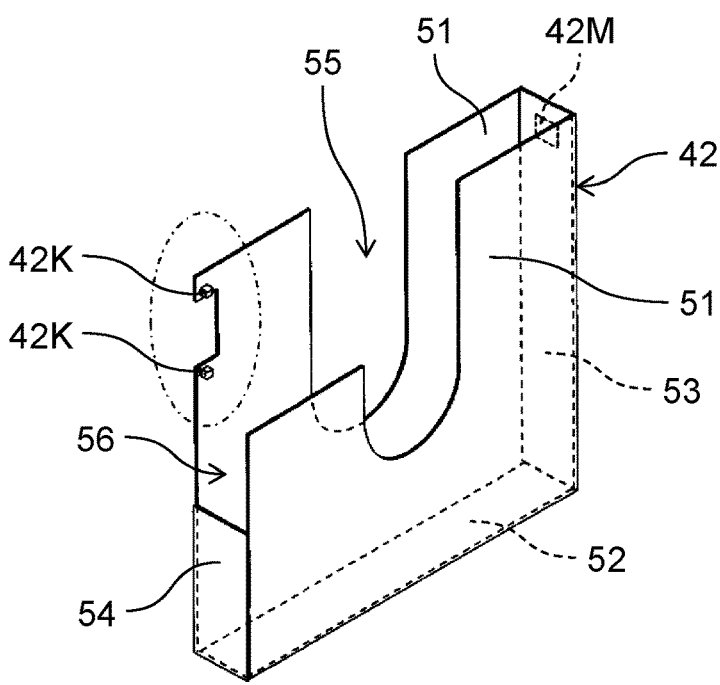
FIG. 6A is a perspective view of a case used when the carrier tape processing device according to the exemplary embodiment of the present disclosure manufactures the encased roll body.
Figure 6B:
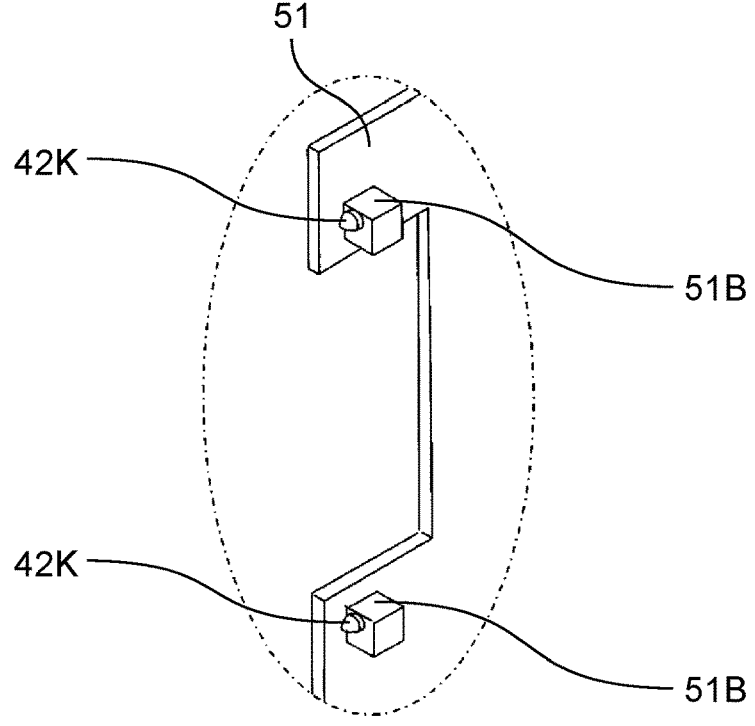
FIG. 6B is a partially enlarged view of the case used when the carrier tape processing device according to the exemplary embodiment of the present disclosure manufactures the encased roll body.

Here, case 42 of encased roll body 41 will be described. As illustrated in FIG. 6A, case 42 includes left and right side walls 51, bottom wall 52, front wall 53, and rear wall 54, and has upper opening 55 and rear opening 56. Radio tag 42M is attached to an outer surface of front wall 53. Two upper and lower protruding bases 51B protruding inward from an inner surface of one side wall 51 are provided on an upper portion of rear wall 54, and two protruding bases 51B are provided with tape tip holders 42K protruding outward in the horizontal direction (FIG. 6B).

Figure 7A:
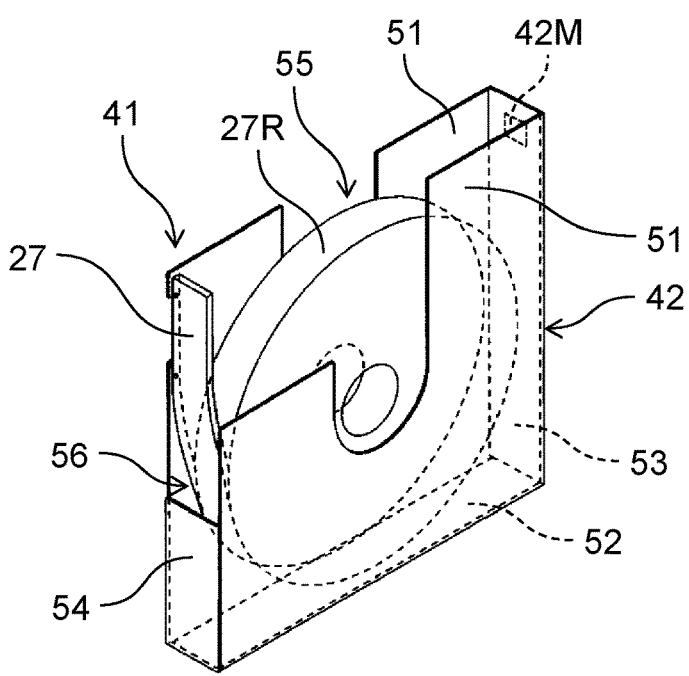
FIG. 7A is a perspective view of the encased roll body manufactured by the carrier tape processing device according to the exemplary embodiment of the present disclosure.
Figure 7B:
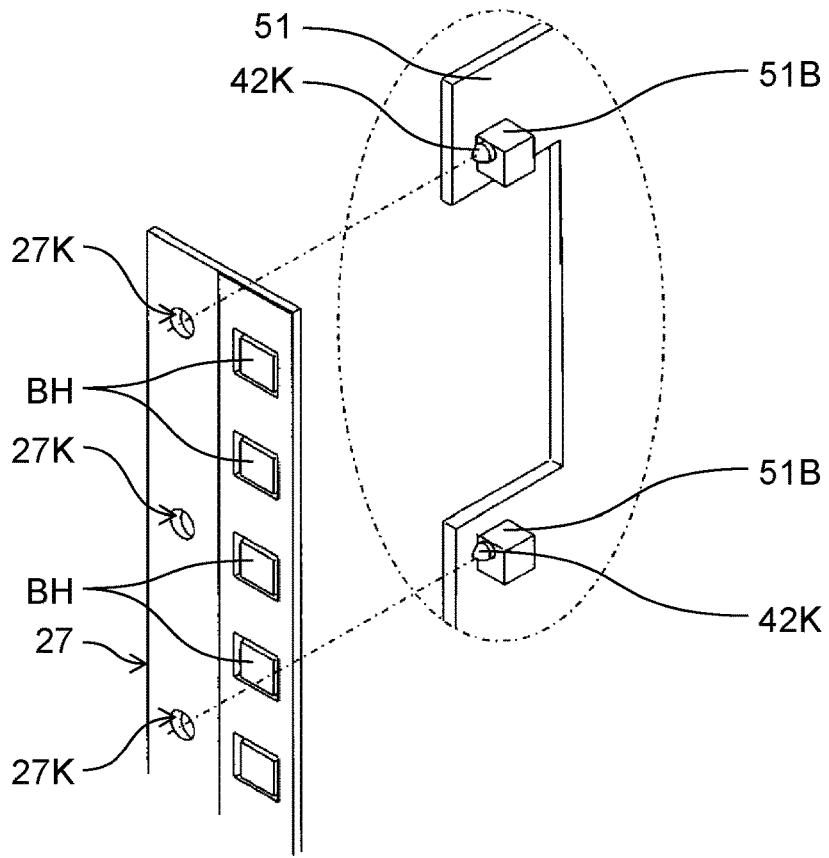
FIG. 7B is a partially enlarged view of the encased roll body manufactured by the carrier tape processing device according to the exemplary embodiment of the present disclosure.

As illustrated in FIGS. 7A and 7B, when encased roll body 41 is in the state of being stored or transported, tape tip holder 42K provided in case 42 is inserted into and locked to feed hole 27K (hole to be engaged with an outer peripheral tooth of sprocket 26S) of carrier tape 27. Note that the time when encased roll body 41 is in the state of being stored or transported refers to a case where roll body 27R has been housed in case 42 but carrier tape 27 is not pulled out from roll body 27R and used yet in this state. In the present exemplary embodiment, two tape tip holders 42K provided in case 42 are inserted into and locked to two feed holes 27K. This prevents carrier tape 27 from coming off case 42 of encased roll body 41 in the state of being stored or transported so that entire roll body 27R is prevented from falling off case 42.

Figure 3:
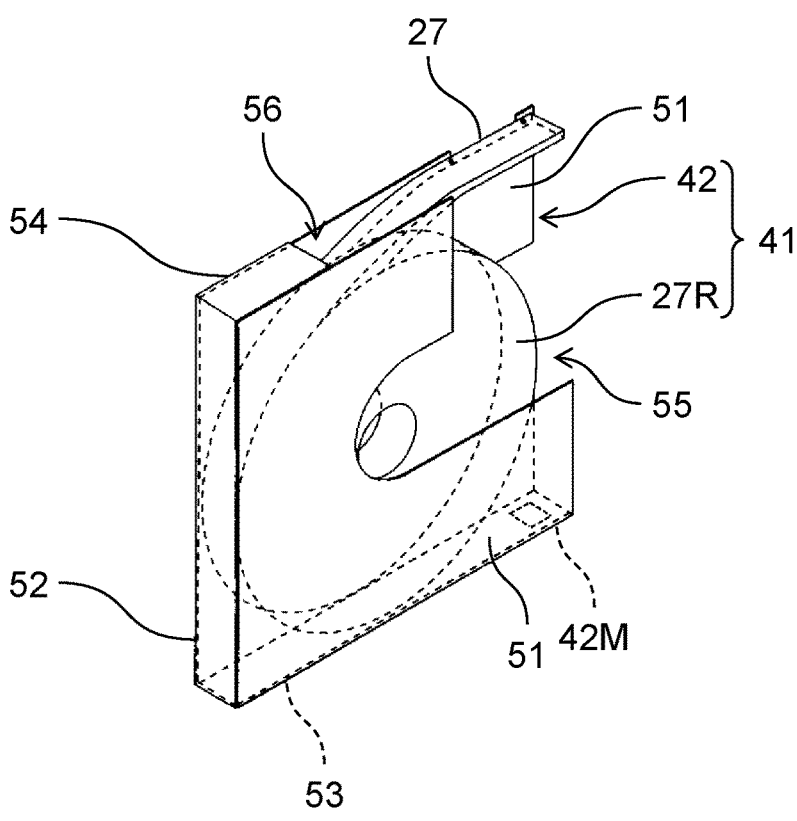
FIG. 3 is a perspective view of an encased roll body used in the component mounting device according to the exemplary embodiment of the present disclosure.
Figure 4:
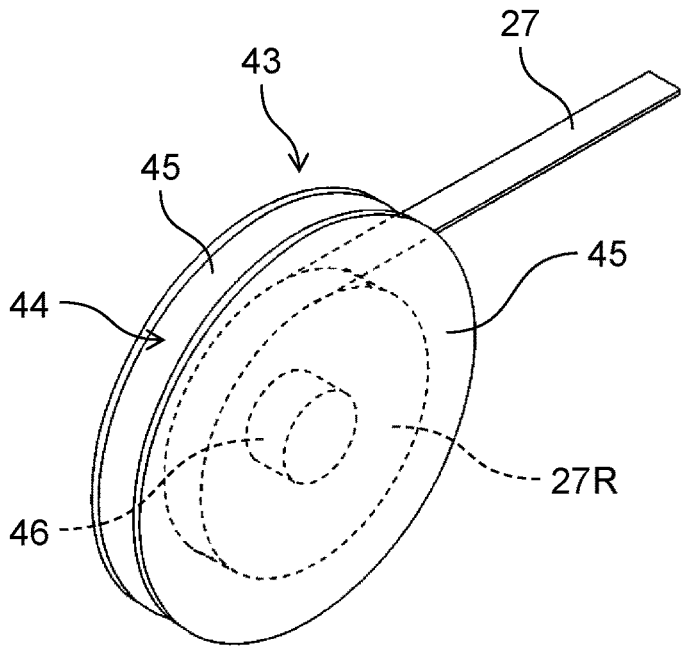
FIG. 4 is a perspective view of a reel-equipped roll body according to the exemplary embodiment of the present disclosure.

On the other hand, in the state where carrier tape 27 is pulled out from encased roll body 41 and uses, two tape tip holders 42K are detached from feed holes 27K of carrier tape 27, and further, an attitude is formed such that front wall 53 becomes a lower surface as illustrated in FIG. 3. Carrier tape 27 can be fed to component supply unit 26 by pulling out carrier tape 27 from rear opening 56 in such an attitude with front wall 53 as the lower surface. Since tape tip holders 42K are provided in case 42 in this manner, a position of a tip part of carrier tape 27 in case 42 is unified, and thus, work of taking out the tip part of carrier tape 27 from case 42 can be easily performed. In addition, it is possible to easily cope with a case where the work of taking out the tip part of carrier tape 27 is performed by automated equipment such as a robot.

Figure 8A:
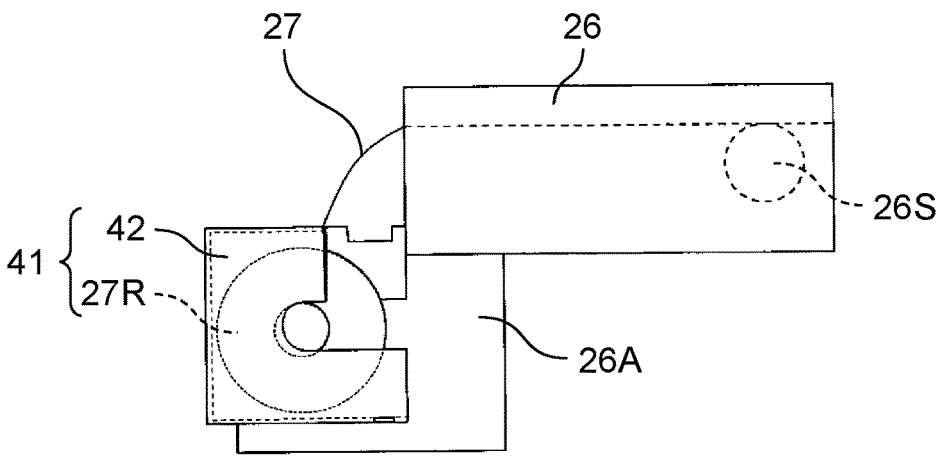
FIG. 8A is a view illustrating a usage mode of the encased roll body manufactured by the carrier tape processing device according to the exemplary embodiment of the present disclosure.
Figure 8B:
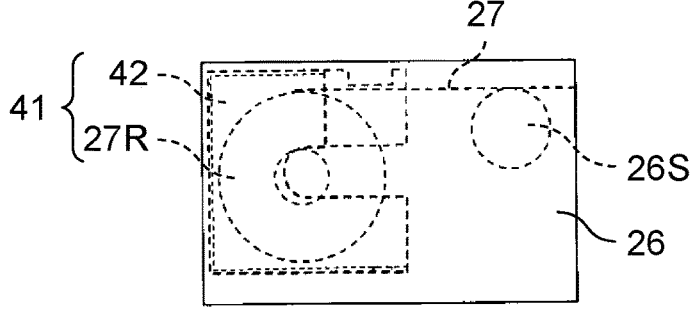
FIG. 8B is a view illustrating a usage mode of the encased roll body manufactured by the carrier tape processing device according to the exemplary embodiment of the present disclosure.
Figure 8C:
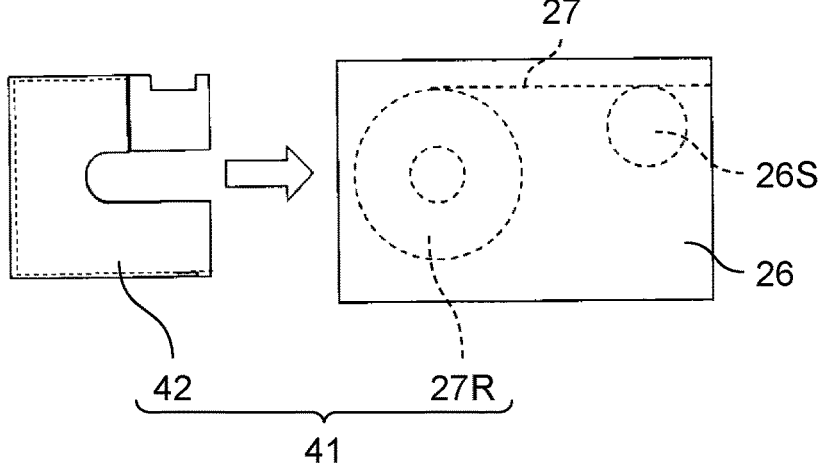
FIG. 8C is a view illustrating a usage mode of the encased roll body manufactured by the carrier tape processing device according to the exemplary embodiment of the present disclosure.

Examples of a usage mode of encased roll body 41 with respect to component supply unit 26 include not only a mode of being attached to feeder carriage 25 as in encased roll body 41 illustrated on the left side of FIG. 2 but also a mode of being attached to component supply unit 26 through attachment 26A as in encased roll body 41 illustrated on the right side of FIG. 2 and FIG. 8A. Alternatively, there is also a mode in which entire encased roll body 41 is housed inside component supply unit 26 as illustrated in FIG. 8B. Alternatively, there is also a mode in which roll body 27R is taken out from encased roll body 41, and only roll body 27R is housed inside component supply unit 26 as illustrated in FIG. 8C.

In this manner, in the present exemplary embodiment, case 42 of encased roll body 41 can be imparted with a role of a support means of roll body 27R when roll body 27R is installed outside component supply unit 26 and used (a role of reel 44 in reel-equipped roll body 43).

Next, carrier tape processing device 3 will be described. Carrier tape processing device 3 is a device that processes carrier tape 27 to be used in component mounting device 14 to manufacture encased roll body 41. Carrier tape processing device 3 has functions of taking out roll body 27R from reel 44 of conventional reel-equipped roll body 43, housing roll body 27R in case 42, and collecting reel 44.

Figure 9:
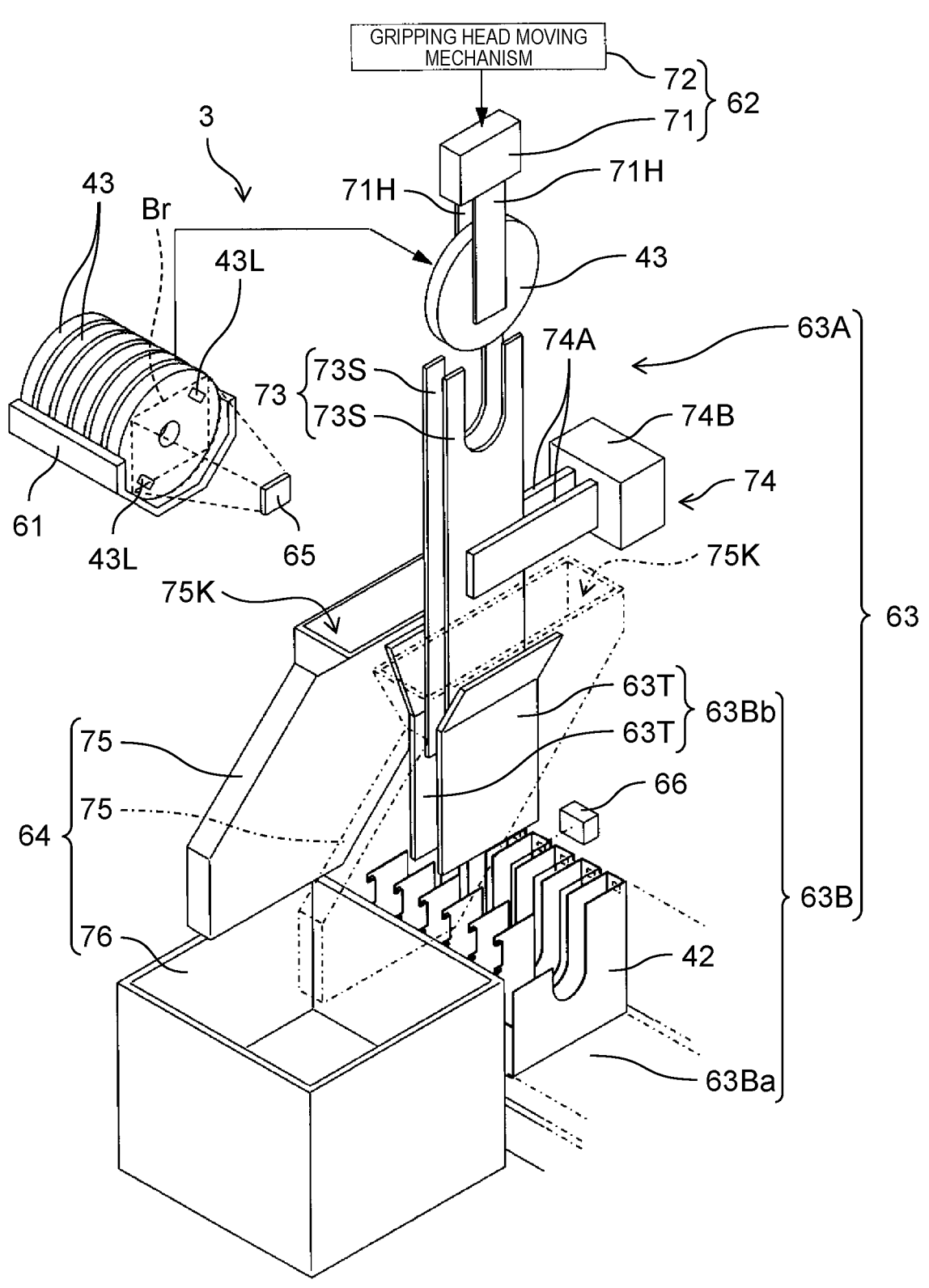
FIG. 9 is a perspective view of the carrier tape processing device according to the exemplary embodiment of the present disclosure.
Figure 10:
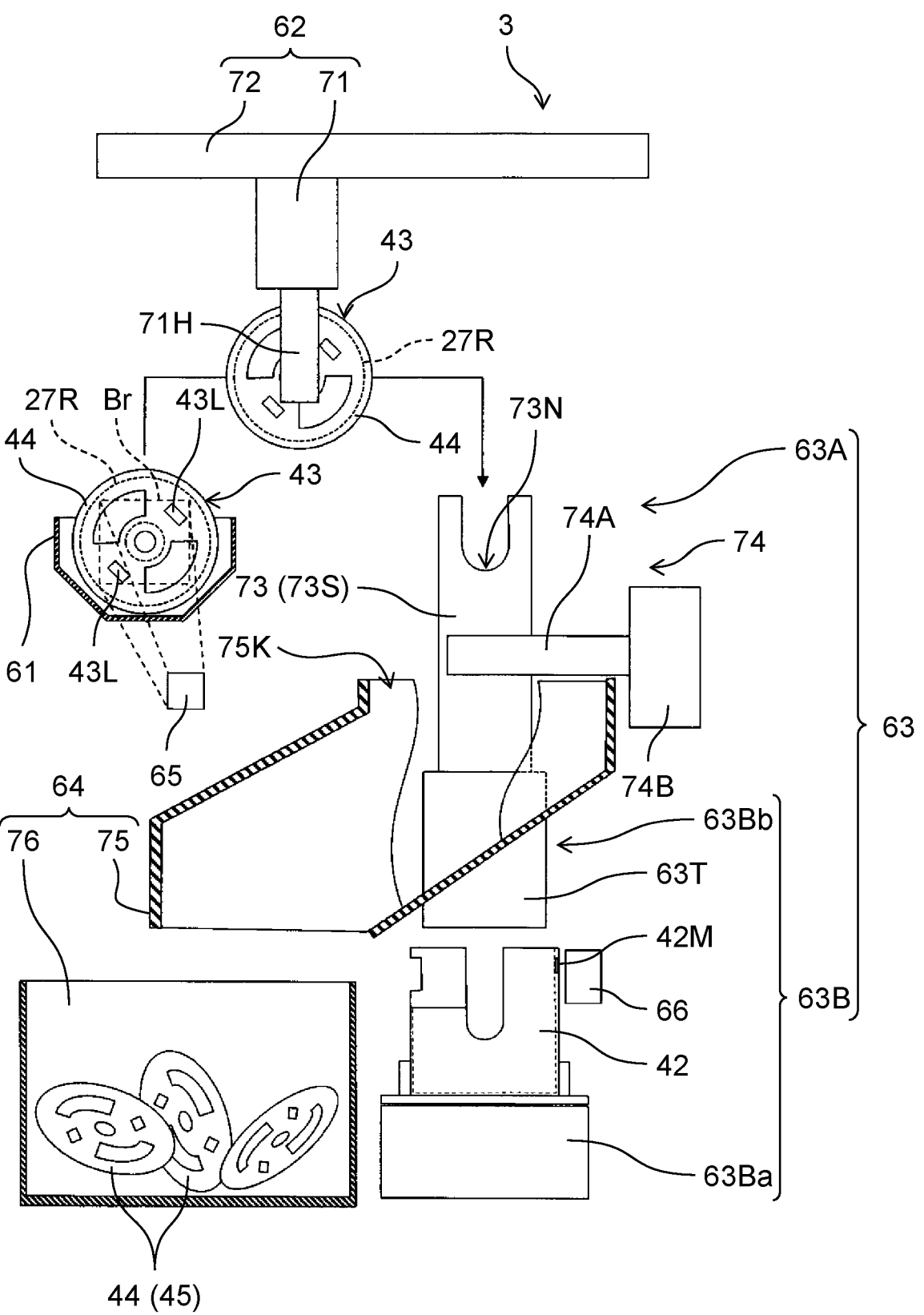
FIG. 10 is a side view of the carrier tape processing device according to the exemplary embodiment of the present disclosure.
Figure 11:
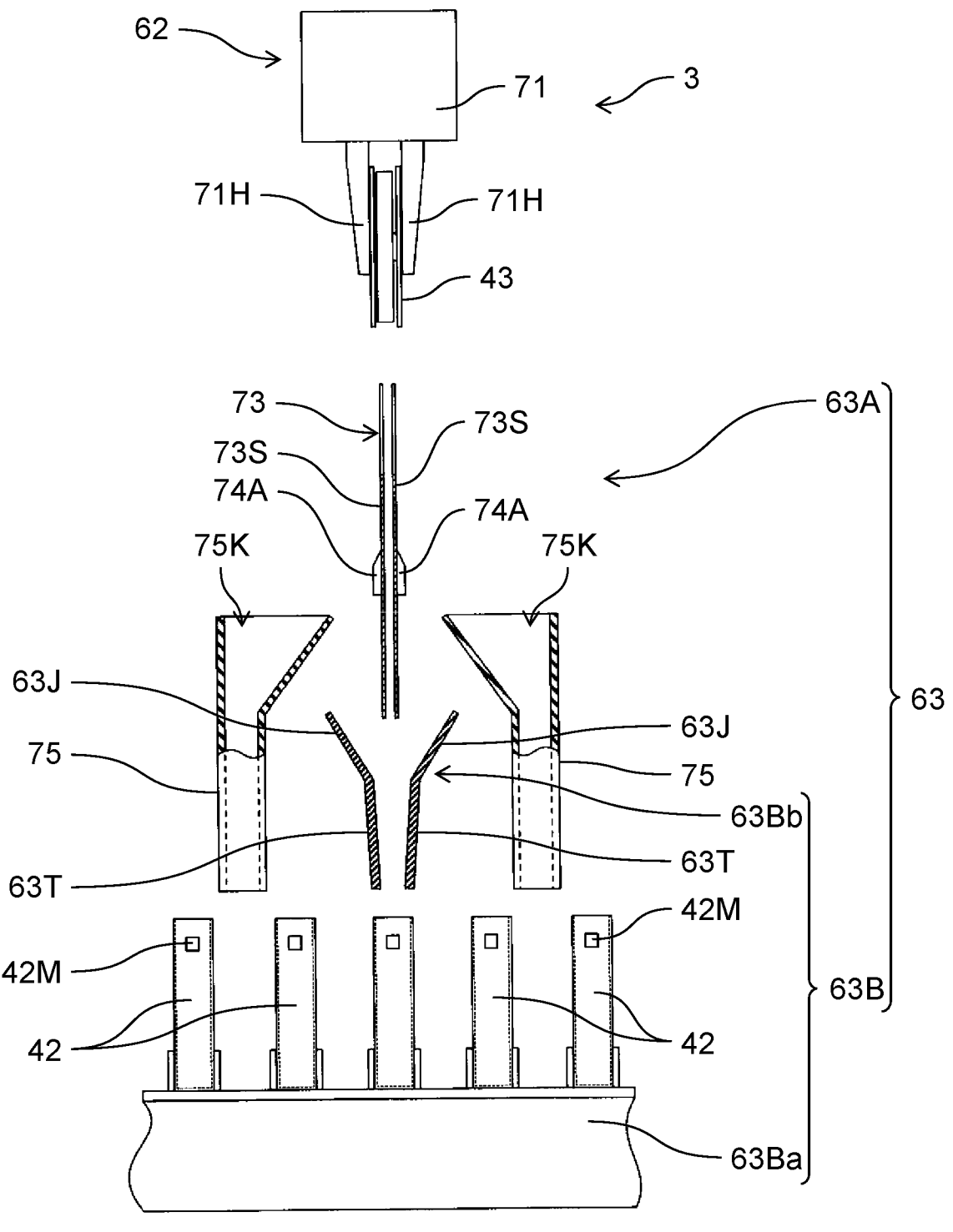
FIG. 11 is a front view of a main part of the carrier tape processing device according to the exemplary embodiment of the present disclosure.

As illustrated in FIGS. 9, 10, and 11, carrier tape processing device 3 according to the present exemplary embodiment includes reel supply part 61, reel conveying unit 62, roll body extractor 63, collector 64, reading unit 65 (component information acquisition unit), and writing unit 66.

Reel supply part 61 has a function of supplying reel-equipped roll body 43. As illustrated in FIGS. 9 and 10, reel supply part 61 includes, for example, a container-shaped member that is open upward, and holds a plurality of reel-equipped roll bodies 43 in a state of being arranged in the lateral direction.

Reel conveying unit 62 has a function of gripping and moving reel-equipped roll body 43, supplied from reel supply part 61, upward of roll body extractor 63. As illustrated in FIGS. 9 and 10, reel conveying unit 62 includes gripping head 71 and gripping head moving mechanism 72. Gripping head 71 grips reel-equipped roll body 43 supplied from reel supply part 61 by two gripping parts 71H extending downward. Gripping head moving mechanism 72 moves gripping head 71 gripping reel-equipped roll body 43 in the horizontal plane and the vertical direction.

Roll body extractor 63 has a function of extracting roll body 27R from reel 44 of reel-equipped roll body 43 and housing extracted roll body in case 42. Roll body extractor 63 includes: separation unit 63A that separates roll body 27R from reel 44 of reel-equipped roll body 43; and roll body housing unit 63B that houses roll body 27R, separated from reel 44 by separation unit 63A, in case 42.

As illustrated in FIGS. 9 and 10, separation unit 63A includes separator 73 and separator driver 74. Separator 73 includes a pair of movable plates 73S which face each other in the horizontal direction and extend in the vertical direction. Each of movable plates 73S is provided with a U-shaped clearance 73N recessed downward from an upper edge (FIG. 10).

In FIGS. 9 and 10, separator driver 74 includes a pair of (two) arms 74A and arm driver 74B that moves two arms 74A. One end parts of two arms 74A are attached to two movable plates 73S, respectively, and extend in the substantially horizontal direction. Arm driver 74B can change an interval between two arms 74A (hence, interval of separator 73) by moving two arms 74A in the horizontal direction.

In FIGS. 9 and 10, roll body housing unit 63B includes case holder 63Ba and chute 63Bb. Roll body housing unit 63B has a function of holding empty case 42 and conveying the same in the horizontal direction. Chute 63Bb has a function of guiding roll body 27R such that roll bodies 27R separated from reels 44 by separation unit 63A are housed one by one in empty cases 42 held by case holder 63Ba.

As illustrated in FIGS. 9, 10, and 11, case holder 63Ba includes a conveyor mechanism extending in the horizontal direction. Case holder 63Ba holds the plurality of cases 42 in a state of being arranged in a line such that upper openings 55 face upward, and intermittently conveys cases 42 in the horizontal direction.

As illustrated in FIGS. 9, 10, and 11, chute 63Bb includes a pair of (two) chute members 63T. Two chute members 63T are disposed to face each other in a direction in which two movable plates 73S constituting separator 73 face each other. Two chute members 63T are disposed below separator 73.

In FIG. 11, two chute members 63T form a shape in which upper end parts 63J are widened as proceeding upward. An interval between the upper end parts of two chute members 63T is wider than an interval between lower end parts of two movable plates 73S constituting separator 73. In addition, an interval between two chute members 63T becomes narrower as proceeding toward lower ends (FIG. 11).

Chute 63Bb guides roll body 27R, separated from reel 44 as reel 44 is disassembled by separation unit 63A, downward, thereby housing roll body 27R in case 42 located on the lower side. Accordingly, one roll body 27R is housed in one case 42.

Collector 64 has a function of collecting reel 44 disassembled by separation unit 63A. As illustrated in FIGS. 9 and 10, collector 64 includes a pair of reel discharge chutes 75 and collection box 76.

Two reel discharge chutes 75 have tubular shapes in which opening parts become wider as proceeding upward. Upper end openings 75K of two reel discharge chutes 75 are located on sides of separator 73 (sides of two movable plates 73S). Collection box 76 is a container-shaped member that is open upward, and is provided below two reel discharge chutes 75.

When reel 44 is disassembled by separation unit 63A, first, reel-equipped roll body 43 gripped by gripping head 71 of reel conveying unit 62 is positioned above separator 73 (FIG. 11). Further, the interval between the upper end parts of two movable plates 73S constituting separator 73 is set to be smaller than the interval between two side plates 45 constituting reel 44 of reel-equipped roll body 43 (arrow A in FIG. 12A), and then, gripping head 71 is lowered relative to separator 73 such that the upper end parts of two movable plates 73S are inserted between two side plates 45 from below (arrow B illustrated in FIG. 12A).

When upper end parts of two movable plates 73S have been inserted between two side plates 45 from below, arm driver 74B is activated to increase the interval between two movable plates 73S. At this time, the interval between two movable plates 73S is set to be larger than the interval between two side plates 45 (arrow C illustrated in FIG. 12B). As a result, movable plates 73S push and widen side plates 45 outward to widen a gap between side plate 45 and roll body 27R.

Figures 12A, 12B, 12C:
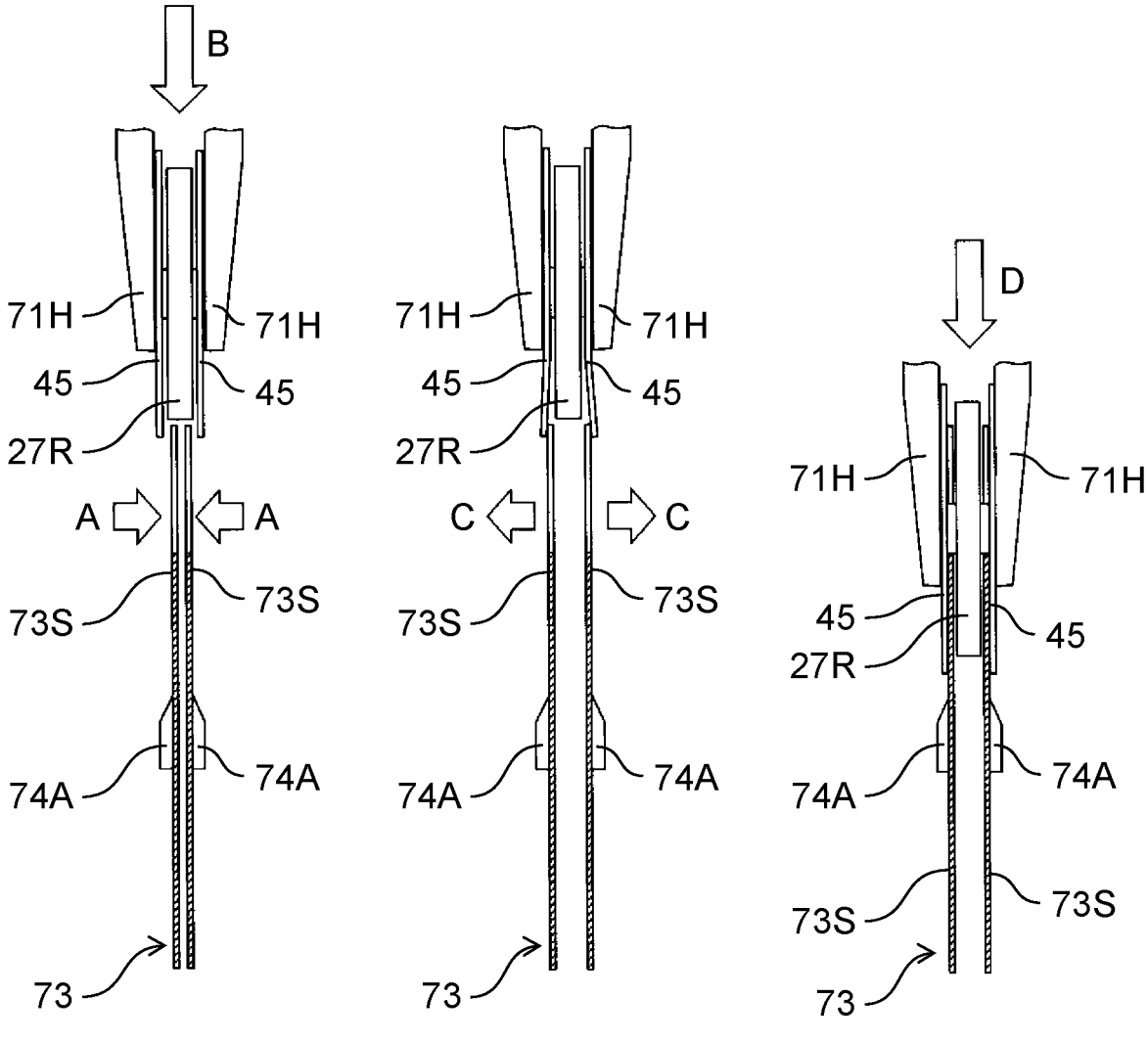
FIG. 12A is a view for describing an operation of disassembling the reel by the carrier tape processing device according to the exemplary embodiment of the present disclosure.
FIG. 12B is a view for describing the operation of disassembling the reel by the carrier tape processing device according to the exemplary embodiment of the present disclosure.
FIG. 12C is a view for describing the operation of disassembling the reel by the carrier tape processing device according to the exemplary embodiment of the present disclosure.

As the gap between side plate 45 and roll body 27R increases by increasing the interval between two movable plates 73S (FIG. 12B), gripping head 71 is further lowered relative to separator 73 (arrow D illustrated in FIG. 12 C). Accordingly, each of two movable plates 73S is inserted into the respective widened gap between side plate 45 and roll body 27R. At this time, winding core 46 enters clearance 73N formed in each of movable plates 73S.

Figure 13:
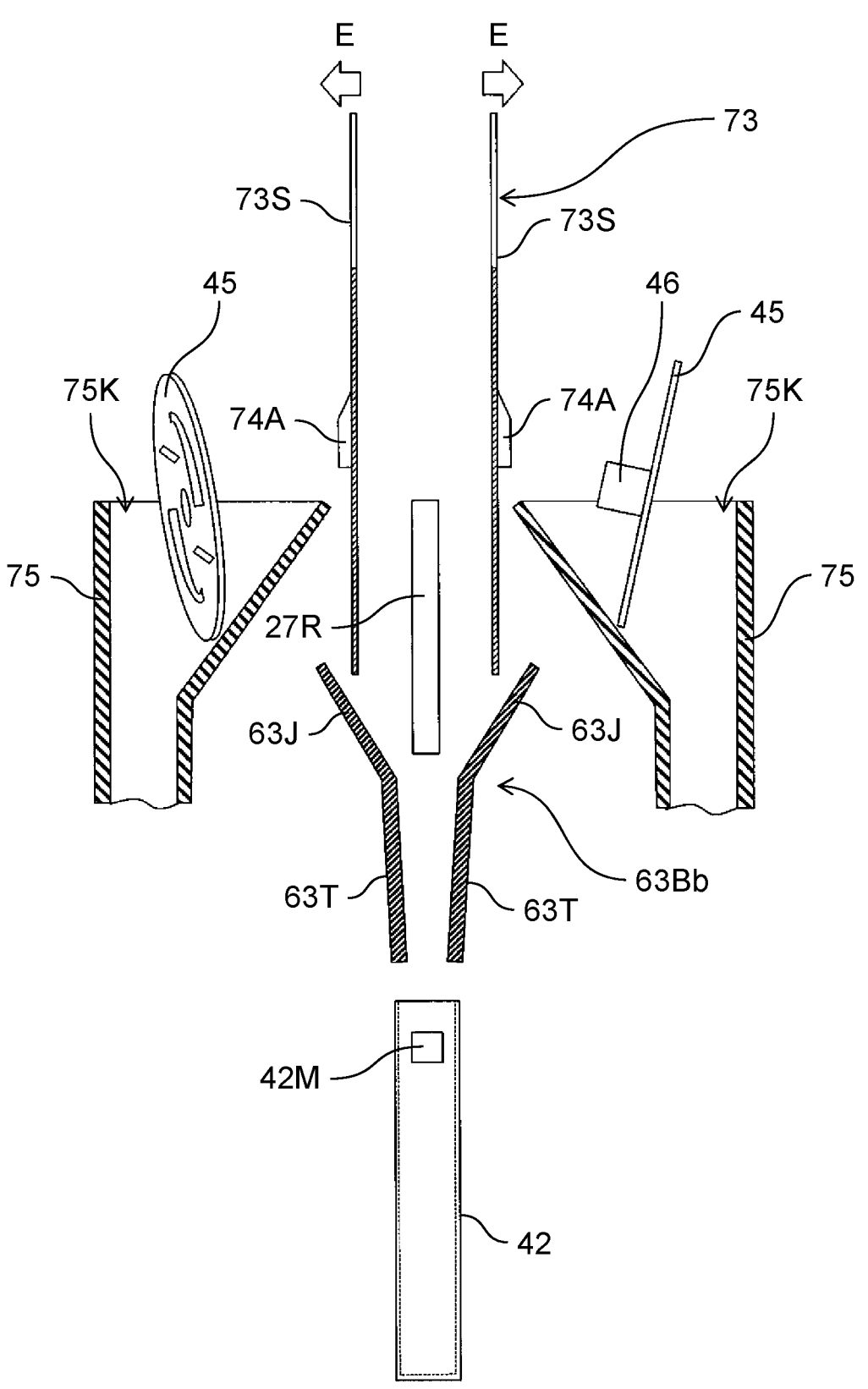
FIG. 13 is a view illustrating a state immediately after the reel is disassembled by the carrier tape processing device according to the exemplary embodiment of the present disclosure.

When each of two movable plates 73S is inserted into the respective gap between side plate 45 and roll body 27R, arm driver 74B further widens the interval between two movable plates 73S (arrow E illustrated in FIG. 13). Accordingly, two side plates 45 are pulled off, and the plurality of recesses 46K provided on winding core 46 of one side plate 45 and the plurality of protrusions 45T provided on another side plate 45 are separated (FIG. 13). Accordingly, reel 44 is divided into two portions, that is, a portion including one side plate 45 and a portion including another side plate 45. Roll body 27R separated from reel 44 passes a gap between two chutes 63Bb constituting roll body housing unit 63B and is housed in empty case 42 located immediately below roll body housing unit 63B.

On the other hand, side plate 45 on one side of the reel 44 divided into the two portions drops into upper end opening 75K of reel discharge chute 75 on one side, and side plate 45 on the other side drops into upper end opening 75K of reel discharge chute 75 on the other side (FIG. 13). These two side plates 45 fall through reel discharge chutes 75, respectively, and are put into collection box 76 to be collected.

In FIG. 9, reading unit 65 includes a reader or a camera that optically reads an identifier (symbol), such as a barcode or a two-dimensional code, printed (recorded) on the outer surface of reel 44, and is provided in the vicinity of reel supply part 61. The identifier includes component information of component BH housed in carrier tape 27. In the present exemplary embodiment, reading unit 65 reads a code printed on code label 43L (FIGS. 9 and 10) affixed to reel 44 of reel-equipped roll body 43 held by reel supply part 61 to acquire (read) the component information. Broken line Br in FIGS. 9 and 10 schematically indicates a reading range of reading unit 65. Here, the "component information" is information on component BH housed in carrier tape 27 of reel-equipped roll body 43, and may include at least one of a type of component BH, a component name, a characteristic, a date of manufacture, a manufacturer, an expiration date, a quantity of the component, and access information (URL or the like) for accessing these pieces of information may be included.

In this manner, reading unit 65 is the component information acquisition unit that acquires the component information that is the information on the component housed in carrier tape 27 in the present exemplary embodiment. Note that, in a case where reel 44 has a radio tag storing the component information, a contactless reader having a function of reading the information of the radio tag in a non-contact manner may be used as reading unit 65. In addition, reading unit 65 reads the component information from reel 44 of reel supply part 61, but may read the component information from reel 44 gripped by gripping head 71. In addition, reading unit 65 is disposed at a position where the identifier of reel 44 of reel supply part 61 can be read in the present exemplary embodiment, but may be disposed at any position as long as the identifier can be read. In addition, reading unit 65 may be mounted on gripping head 71 or a robot arm (not illustrated) so as to be movable. Furthermore, reading unit 65 may be configured using a wireless or wired hand scanner, and the identifier of reel 44 may be read by the operation of operator OP (see FIG. 14).

Writing unit 66 writes information in radio tag 42M attached to case 42 held by case holder 63Ba by radio communication. The information written in radio tag 42M by writing unit 66 is the component information acquired (read) by reading unit 65 and identification information.

Here, the "identification information" is information used to identify component BH housed in one roll body 27R used in component mounting system 1 from components BH housed in other roll bodies 27R. The identification information includes, for example, a serial number issued in a factory in which component mounting system 1 is installed. In the present exemplary embodiment, the identification information is generated (issued) by management computer 6 when roll body 27R separated from reel 44 is housed in case 42 as described later. In addition, the identification information is also used as management information for managing case 42. That is, the identification information is used for both the purpose of identifying roll body 27R and the purpose of identifying case 42.

Next, storage warehouse 4 will be described. Storage warehouse 4 stores encased roll body 41. Encased roll body 41 referred to herein includes not only encased roll body 41 just manufactured by carrier tape processing device 3 but also in-use encased roll body 41 that has been used in component mounting device 14 and returned halfway.

Figure 14:
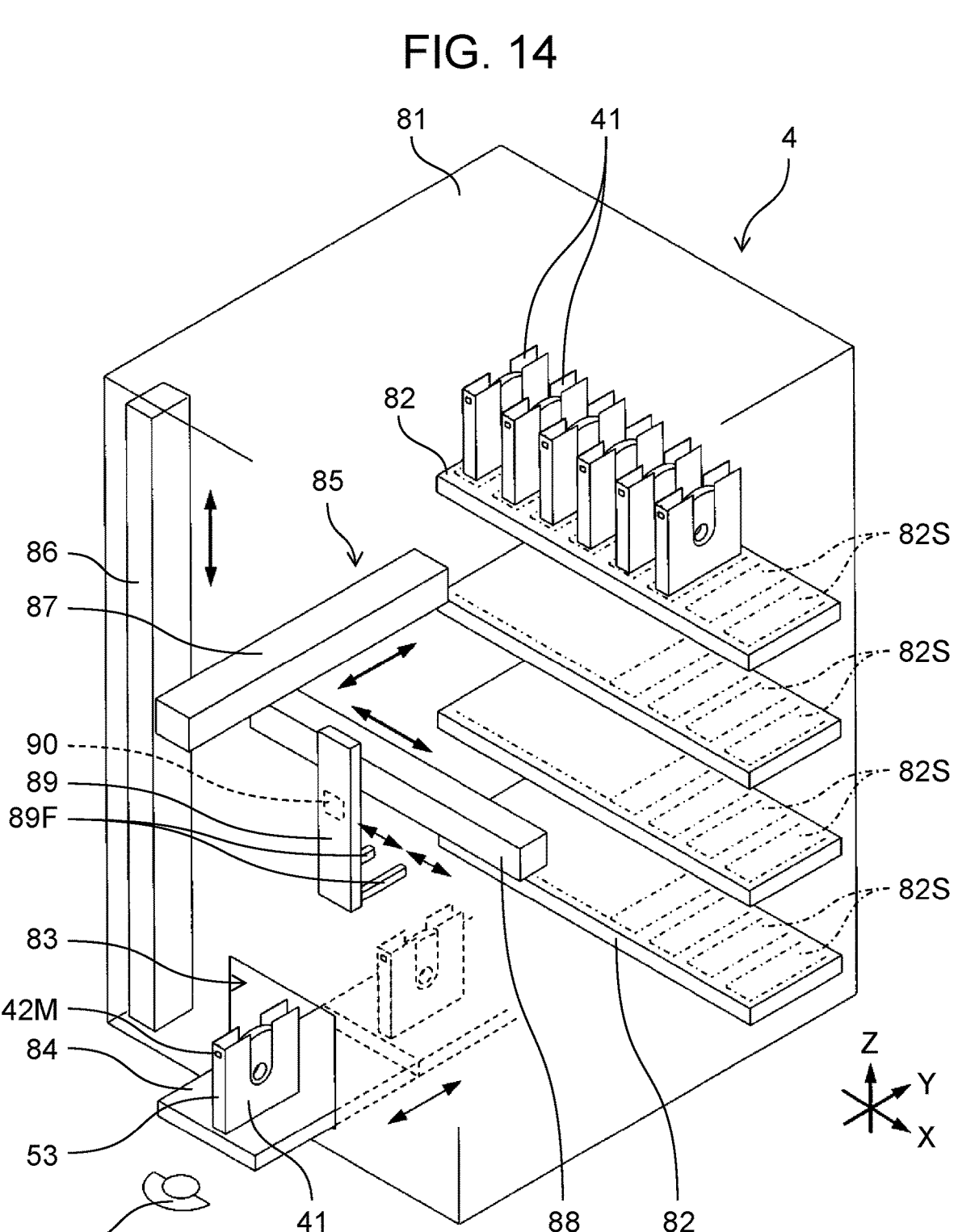
FIG. 14 is a perspective view of a storage warehouse according to the exemplary embodiment of the present disclosure.

In FIG. 14, storage warehouse 4 includes a plurality of shelves 82 (storages) in housing 81. Entrance 83 is provided in a lower part of a front surface of housing 81, and moving table 84, which performs an operation of protruding to the outside of housing 81 (the front side of operator OP) through entrance 83 and an operation of retracting to the inside of housing 81 (the back side as viewed from operator OP), is provided inside housing 81. Moving table 84 protrudes to the front side of operator OP when encased roll body 41 is stored in storage warehouse 4, and retracts to the back side when encased roll body 41 placed on moving table 84 is housed in housing 81.

A plurality of storage positions 82S for storing (placing) encased roll bodies 41 is set in advance in each of the plurality of shelves 82 provided in storage warehouse 4. That is, each of shelves 82 is a storage including the plurality of storage positions 82S for storing cases 42 (that is, encased roll bodies 41) storing roll bodies 27R in the present exemplary embodiment.

In FIG. 14, case transfer mechanism 85 is provided in housing 81. Case transfer mechanism 85 includes: Z-axis table 86 extending in a vertical direction (referred to as a Z-axis direction); Y-axis table 87 that extends in a front-rear direction (referred to as a Y-axis direction) as viewed from operator OP and is moved in the vertical direction by Z-axis table 86; X-axis table 88 which extends in a lateral direction (referred to as an X-axis direction) as viewed from operator OP and is moved in the front-rear direction by Y-axis table 87; and transfer head 89 that is moved in the X-axis direction by X-axis table 88.

Case transfer mechanism 85 moves transfer head 89 three-dimensionally by a movement operation of Y-axis table 87 in the Z-axis direction by Z-axis table 86, movement of X-axis table 88 in the Y-axis direction by Y-axis table 87, and movement of transfer head 89 in the X-axis direction by X-axis table 88. Transfer head 89 includes two fingers 89F arranged in the X-axis direction.

Phase head 89 can bring two fingers 89F close to or away from each other in the X-axis direction. When two fingers 89F are activated to close with encased roll body 41 located between two fingers 89F, encased roll body 41 is gripped by two fingers 89F (that is, by transfer head 89).

In FIG. 14, transfer head 89 is provided with contactless reader 90 in which an imaging visual field is directed in a depth direction as viewed from operator OP. Contactless reader 90 is opposite to radio tag 42M provided in case 42 of encased roll body 41 at a position where transfer head 89 grips encased roll body 41.

Contactless reader 90 reads information written in radio tag 42M (component information and identification information of component BH housed in roll body 27R) by radio communication in the state of being opposite to radio tag 42M. In the present exemplary embodiment, contactless reader 90 functions as an identification information reading unit that reads identification information written in radio tag 42M which serves as a storage unit. When information written in radio tag 42M of encased roll body 41 is read, contactless reader 90 stores the read information in management computer 6 (to be described later).

Unique addresses are respectively given to storage positions 82S defined in each of the plurality of shelves 82. In the present exemplary embodiment, when encased roll body 41 is stored (placed) in storage position 82S, information in which the information (component information) of component BH housed in roll body 27R (carrier tape 27) of encased roll body 41 is associated with (so-called linked with) the identification information of encased roll body 41 is stored in management computer 6. Further, information in which the component information is associated with information (storage position information) of storage position 82S is stored in management computer 6 (to be described later). Accordingly, management computer 6 can grasp which storage position 82S of storage warehouse 4 stores encased roll body 41 housing which component BH.

Figure 15:
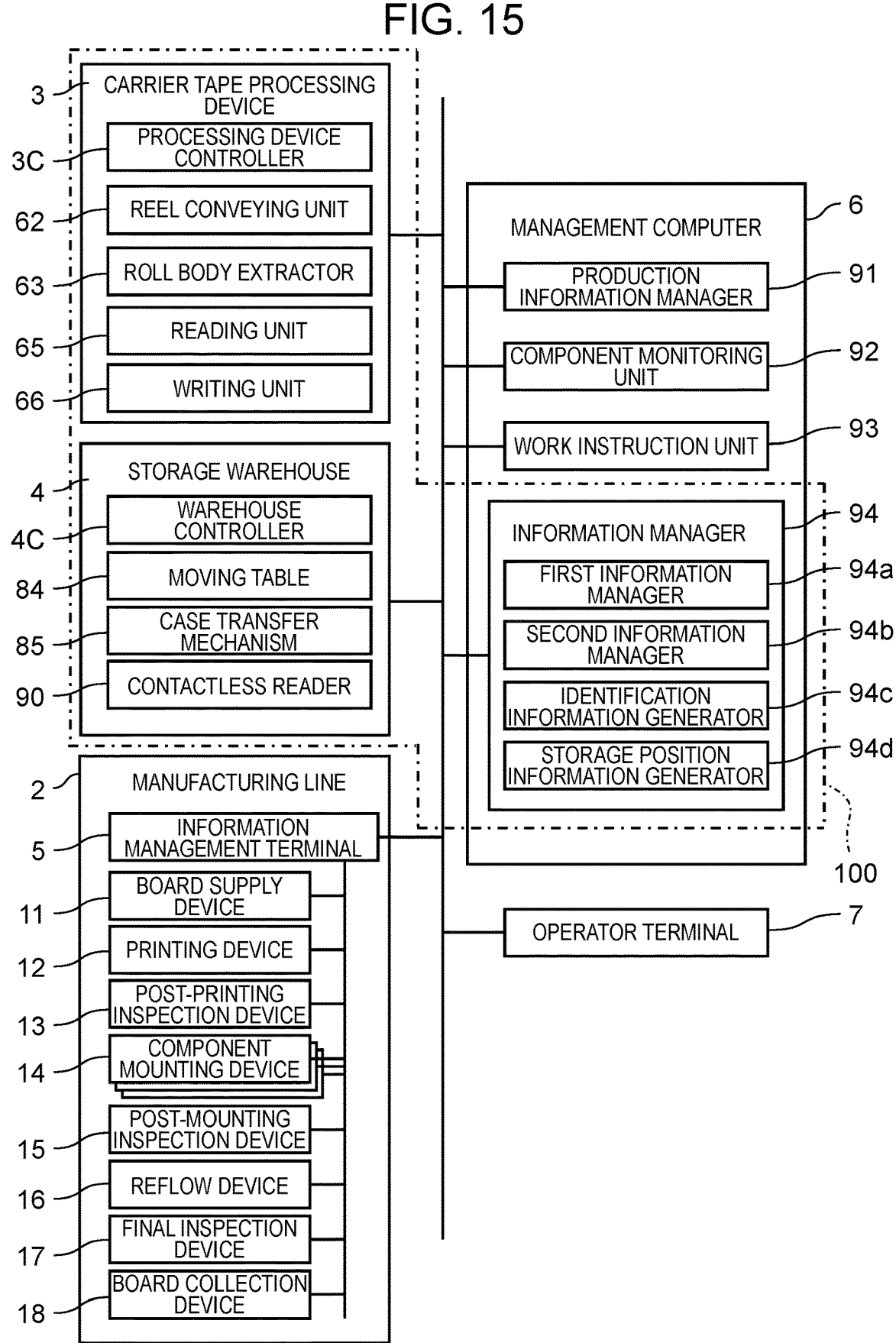
FIG. 15 is a block diagram illustrating a control system of the component mounting system according to the exemplary embodiment of the present disclosure.

FIG. 15 is a block diagram illustrating a control system in entire component mounting system 1. As illustrated in FIG. 15, management computer 6 includes production information manager 91, component monitoring unit 92, work instruction unit 93, and information manager 94. Production information manager 91 stores production plan data in component mounting system 1. Component monitoring unit 92 monitors the number of remaining components BH in manufacturing line 2. When a component shortage is predicted, component monitoring unit 92 transmits such a fact to work instruction unit 93.

Work instruction unit 93 gives a work instruction at the time of model switching based on the production plan data stored in production information manager 91 with respect to manufacturing line 2 and operator OP, and gives an instruction for delivery of component BH to be used in production of the next model or the like with respect to storage warehouse 4. In addition, work instruction unit 93 gives work instructions (specifically, an instruction for delivery of a component for replenishment with respect to storage warehouse 4 and an instruction for component replenishment work with respect to operator OP) based on information from component monitoring unit 92.

Information manager 94 includes first information manager 94*a*, second information manager 94*b*, identification information generator 94*c*, and storage position information generator 94*d* (FIG. 15). First information manager 94*a* manages the component information, and second information manager 94*b* manages the information (storage position information) of storage position 82S of component BH in storage warehouse 4. Specifically, first information manager 94*a* stores the component information and the identification information of roll body 27R separated from reel 44 in association with each other. In addition, second information manager 94*b* stores the identification information on roll body 27R separated from reel 44 and the information of storage position 82S (storage position information) in association with each other.

Identification information generator 94*c* generates (issues) the identification information on roll body 27R when carrier tape processing device 3 disassembles reel 44 of reel-equipped roll body 43 so that roll body 27R is separated from reel 44. When encased roll body 41 is stored in storage warehouse 4, storage position information generator 94*d* specifies storage position 82S of encased roll body 41 and generates the storage position information.

As illustrated in FIG. 15, carrier tape processing device 3 includes processing device controller 3C. Processing device controller 3C controls reel conveying unit 62, roll body extractor 63, reading unit 65, writing unit 66, and the like included in carrier tape processing device 3. In addition, storage warehouse 4 includes warehouse controller 4C as illustrated in FIG. 15. Warehouse controller 4C controls moving table 84, case transfer mechanism 85, and contactless reader 90 included in storage warehouse 4.

Figure 16:
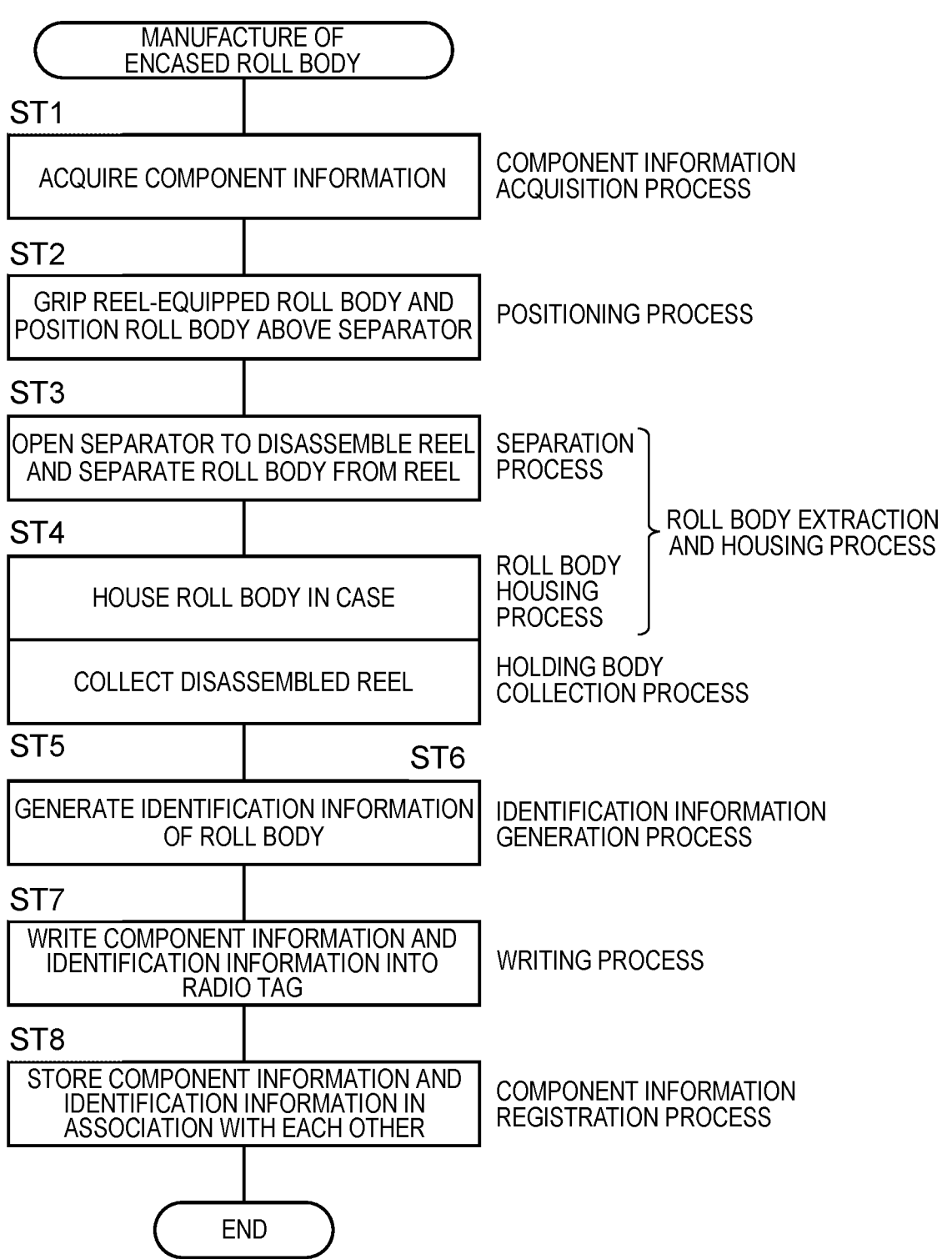
FIG. 16 is a flowchart illustrating a flow of work of manufacturing the encased roll body by the carrier tape processing device according to the exemplary embodiment of the present disclosure.

Next, a flow of manufacturing work (processing work of carrier tape 27) of encased roll body 41 by carrier tape processing device 3 will be described with reference to a flowchart illustrated in FIG. 16. First, processing device controller 3C of carrier tape processing device 3 acquires component information of reel-equipped roll body 43 as a work target among reel-equipped roll bodies 43 supplied by the reel supply part 61 (a component information acquisition process in step ST1). Here, the acquisition of the component information is performed as reading unit 65 reads an identifier of code label 43L affixed to reel 44 of reel-equipped roll body 43 as the work target (FIG. 9), but another method may be used. For example, operator OP may perform an input corresponding to a content of code label 43L from an input device (not illustrated) connected to processing device controller 3C.

When the component information of reel-equipped roll body 43 is acquired in step ST1, processing device controller 3C activates reel conveying unit 62 of carrier tape processing device 3 to cause gripping head 71 to grip reel-equipped roll body 43 as the work target. Further, when gripping head 71 grips reel-equipped roll body 43, gripping head 71 is moved (FIG. 10) to position reel-equipped roll body 43 above separator 73 (a positioning process in step ST2. FIG. 11).

After reel-equipped roll body 43 is positioned above separator 73, processing device controller 3C disassembles reel 44 by separator 73 as described above (FIG. 12A→FIG. 12B→FIG. 12 C), and separates roll body 27R from reel 44 (a separation process in step ST3). Accordingly, reel 44 is divided into two portions, that is, a portion including one side plate 45 and a portion including another side plate 45, and roll body 27R passes through roll body housing unit 63B and is housed in empty case 42 located immediately below roll body housing unit 63B (a roll body housing process in step ST4). In addition, the two portions divided from reel 44 pass through reel discharge chutes 75 and are collected in collection box 76 (a holding body collection process in step ST5).

Here, the separation process in step ST3 and the roll body housing process in step ST4 constitute a roll body extraction and housing process in which roll body 27R is extracted from reel 44 and housed in case 42. Here, reel 44 is the holding body that holds carrier tape 27 housing component BH in the state of roll body 27R. In the roll body housing process out of the roll body extraction and housing process, roll bodies 27R separated from reel 44 in the separation process are stored one by one in empty cases 42. Therefore, one roll body 27R can be managed in the unit of one case 42.

When reel 44 is separated in step ST3, processing device controller 3C requests identification information generator 94*c* of management computer 6 to generate the identification information on roll body 27R separated from reel 44. Further, identification information generator 94*c* requested by processing device controller 3C to generate the identification information generates the identification information on roll body 27R extracted by separation of reel 44 (an identification information generation process in step ST6).

When the identification information is generated by identification information generator 94*c* in step ST6, processing device controller 3C of carrier tape processing device 3 receives the generated identification information. Further, writing unit 66 writes the component information acquired in step ST1 and the identification information generated in step ST6 in radio tag 42M attached to case 42 (case 42 in which roll body 27R is housed in step ST4) (a writing process in step ST7).

After the component information and the identification information are written in radio tag 42M of case 42, processing device controller 3C transmits the information written in radio tag 42M (the component information and the identification information on roll body 27R) to management computer 6 and causes first information manager 94*a* of management computer 6 to store the information (component information and identification information). Accordingly, the identification information, which is the information unique to roll body 27R, and the component information, which is the information on component BH housed in roll body 27R, are registered in management computer 6 in association with each other for roll body 27R separated from reel 44 (a component information registration process in step ST8).

After the information on roll body 27R is written in first information manager 94*a* of management computer 6, processing device controller 3C ends the manufacture of encased roll body 41 (processing operation of carrier tape 27) by carrier tape processing device 3.

Next, a flow of work of storing encased roll body 41 will be described with reference to a flowchart illustrated in FIG. 17. First, warehouse controller 4C of storage warehouse 4 moves moving table 84 to the front side from entrance 83 provided in housing 81. Further, operator OP (or a mobile robot (not illustrated)) places encased roll body 41 on moving table 84 (a placement process in step ST11. FIG. 14). At this time, encased roll body 41 is placed on moving table 84 in an attitude in which upper opening 55 faces upward and front wall 53 faces the front side (the side of operator OP). Accordingly, radio tag 42M provided in case 42 faces the front side (FIG. 14).

When encased roll body 41 is placed on moving table 84, warehouse controller 4C moves moving table 84 to retract encased roll body 41 into housing 81. When encased roll body 41 is retracted into housing 81, warehouse controller 4C moves transfer head 89 to the front side of encased roll body 41 placed on moving table 84. Further, two fingers 89F are activated to close, thereby causing transfer head 89 to grip encased roll body 41. At this time, contactless reader 90 provided in transfer head 89 is opposite to radio tag 42M provided in case 42 of encased roll body 41, and contactless reader 90 reads the identification information written in radio tag 42M (an identification information reading process in step ST12).

When contactless reader 90 reads the identification information written in radio tag 42M, warehouse controller 4C transmits the identification information read by contactless reader 90 to management computer 6. Further, management computer 6 that has received the transmission of the identification information from warehouse controller 4C causes storage position information generator 94d to specify storage position 82S in storage warehouse 4 of encased roll body 41 (encased roll body 41 from which contactless reader 90 has read the identification information) corresponding to the identification information, and generate the storage position information (a storage position information generation process in step ST13). Storage position 82S is specified by being selected from storage positions 82S in empty states at that time arbitrarily or according to a predetermined rule.

When storage position information generator 94d generates the storage position information in step ST13, management computer 6 causes second information manager 94b to store the generated storage position information and the identification information of encased roll body 41 corresponding to the storage position information in association with each other. Accordingly, the identification information, which is unique information of roll body 27R, and the information of the storage position (storage position information) of encased roll body 41 including roll body 27R in storage warehouse 4 are registered in management computer 6 in association with each other for encased roll body 41 to be stored in storage warehouse 4 (a storage position information registration process in step ST14).

When the storage information and the identification information for encased roll body 41 placed on moving table 84 are stored in second information manager 94b in association with each other, management computer 6 activates case transfer mechanism 85 to transfer and store encased roll body 41 placed on moving table 84 into storage position 82S corresponding to the storage position information (a storage process of step ST15). Accordingly, the work of storing encased roll body 41 is completed.

In this manner, roll body 27R can be extracted from the holding body such as reel 44 and housed in case 42, and roll body 27R can be handled as encased roll body 41 in the present exemplary embodiment. Encased roll body 41 can be made compact by making a dimension in the width direction smaller than that of reel-equipped roll body 43, and reel 44 does not remain as waste after roll body 27R (that is, carrier tape 27) is used up so that workability is also good. In addition, case 42 itself is inexpensive, and can be reused (recycled) differently from reel 44, and thus, the cost can be reduced also in this regard.

Furthermore, in the present exemplary embodiment, radio tag 42M as the storage unit capable of storing the component information is provided in case 42, and the component information recorded on reel 44 can be written and stored in radio tag 42M. Therefore, even when roll body 27R is extracted from reel 44, the component information is not lost, and the component information can be managed in the unit of one encased roll body 41. In addition, the component information and the identification information, which is information unique to roll body 27R, are stored in association with each other, and thus, the component information can be managed in the unit of one encased roll body 41.

In component mounting system 1 described above, carrier tape processing device 3 (processing device controller 3C, reel conveying unit 62, roll body extractor 63, reading unit 65 as the component information acquisition unit, and writing unit 66), storage warehouse 4 (shelves 82, warehouse controller 4C, case transfer mechanism 85, and contactless reader 90 as the identification information reading unit), information manager 94 (first information manager 94a, second information manager 94b, identification information generator 94c, and storage position information generator 94d) constitute component management device 100 (FIG. 15).

In management work (a component management method) of managing component BH using component management device 100, first, component information is acquired (the component information acquisition process), and identification information is generated (the identification information generation process). Then, the component information and the identification information are written in radio tag 42M provided in case 42 (the writing process), and the written component information and identification information are stored in first information manager 94a in association with each other (the component information registration process). Further, the identification information reading unit (contactless reader 90) reads the identification information written in radio tag 42M (the identification information reading process), and storage position 82S is specified to generate the storage position information (the storage position information generation process). Then, the identification information and the storage position information are stored in second information manager 94b in association with each other (the storage position information registration process).

According to such a component management method, not only the component information and the identification information on encased roll body 41 are stored in association with each other but also the identification information and the storage position information on encased roll body 41 are stored in association with each other, and thus, it is possible to smoothly perform storage and extraction of encased roll body 41 in storage warehouse 4. Therefore, it is possible to easily and efficiently stock and take out components BH according to component management device 100 (the component management method) of the present exemplary embodiment.

Note that roll body 27R of encased roll body 41 handled by component management device 100 according to the present exemplary embodiment is not necessarily extracted from reel-equipped roll body 43, and may be manufactured as roll body 27R of carrier tape 27 from the beginning. For example, reel-equipped roll body 43 may be roll body 27R manufactured by winding a carrier tape by a measured length from a large capacity of a roll body which serves as a base at the time of manufacturing reel-equipped roll body 43.

Figure 18:
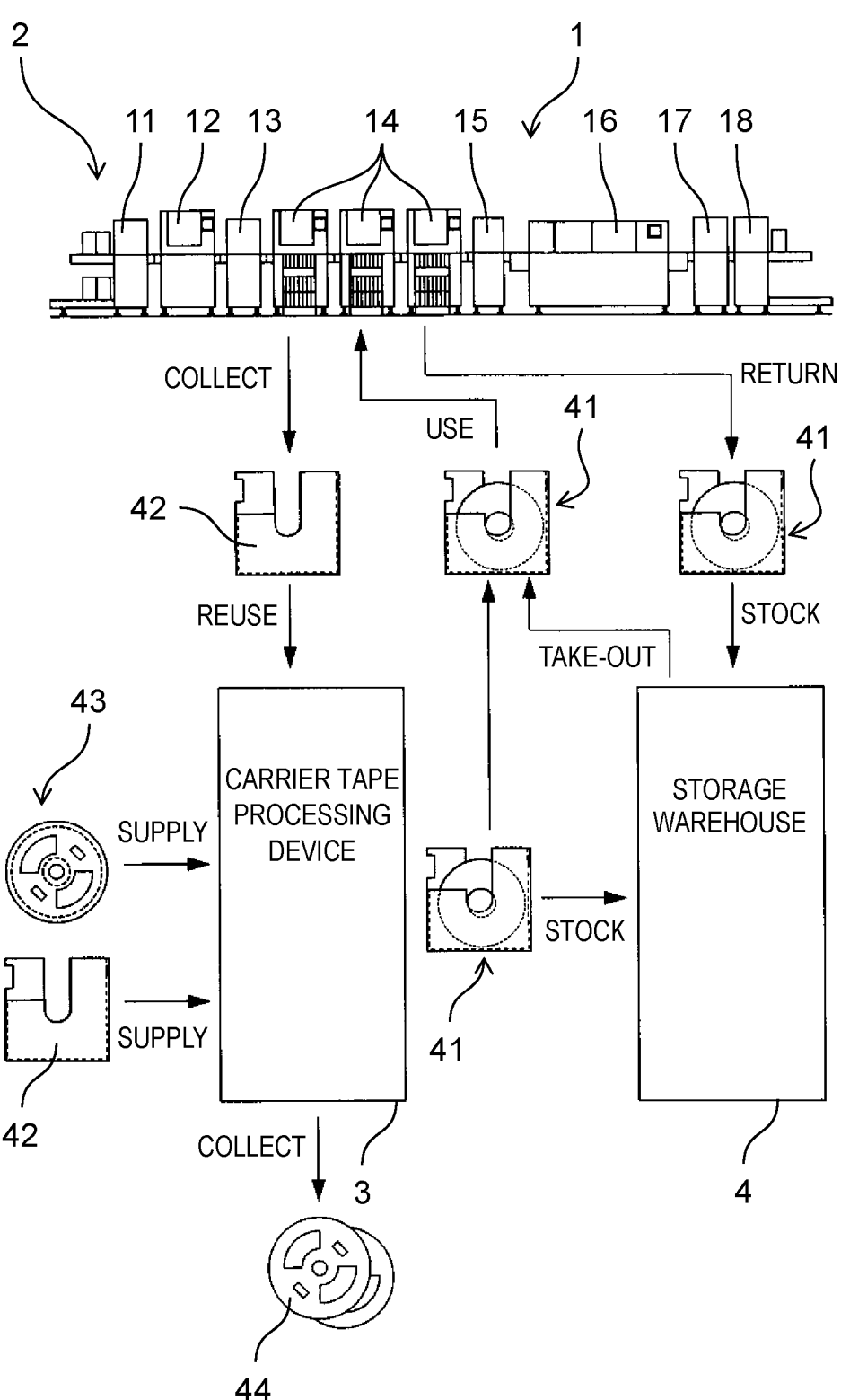
FIG. 18 is a view illustrating an image of the operation of the encased roll body according to the exemplary embodiment of the present disclosure.

FIG. 18 illustrates an image of the operation of encased roll body 41 in component mounting system 1 according to the present exemplary embodiment. As illustrated in this drawing, encased roll body 41 according to the present exemplary embodiment is manufactured by supplying reel-equipped roll body 43 and case 42 to carrier tape processing device 3. A part of encased roll body 41 manufactured by carrier tape processing device 3 is fed to manufacturing line 2 to be used, and the other part is stored (stocked) in storage warehouse 4. Encased roll body 41 stored in storage warehouse 4 is taken out therefrom and fed to manufacturing line 2 to be used. Further, case 42 generated when carrier tape 27 of encased roll body 41 is used up in manufacturing line 2 is collected and supplied to carrier tape processing device 3 to be reused for manufacture of new encased roll body 41. In addition, a part of encased roll body 41 fed to manufacturing line 2 in a state where carrier tape 27 has not been used up is returned to storage warehouse 4 and stored (stocked).

As described above, in component management device 100 (the component management method) according to the present exemplary embodiment, roll body 27R can be extracted from the holding body such as reel 44 and housed in case 42, and roll body 27R can be handled as encased roll body 41. Encased roll body 41 can be made compact by making a dimension in the width direction smaller than that of reel-equipped roll body 43, and reel 44 does not remain as waste after roll body 27R (that is, carrier tape 27) is used up so that workability is also good. In addition, case 42 itself is inexpensive, and can be reused (recycled) differently from reel 44, and thus, the cost can be reduced also in this regard.

Furthermore, the identification information of encased roll body 41 and the storage position information are stored in association with each other in the present exemplary embodiment, and thus, it is possible to smoothly perform the storage and extraction of encased roll body 41 in storage warehouse 4. Therefore, it is possible to easily and efficiently stock and take out components BH according to component management device 100 (the component management method) of the present exemplary embodiment.

Although the exemplary embodiment of the present disclosure has been described above, the present disclosure is not limited to the above exemplary embodiment, and various modifications and the like can be made. For example, reel 44 of reel-equipped roll body 43 is divided into two portions in the above-described exemplary embodiment, but this is an example, and reel 44 may be divided into three or more parts. Even in this case, it is sufficient that each of the plurality of parts generated by the disassembly passes through reel discharge chute 75 and falls into the collection box 76, whereby disassembled reel 44 can be reliably collected.

In addition, a configuration of a disassembly means and a disassembly method for reel 44 described in the above-described exemplary embodiment are merely examples, and roll body 27R may be extracted from reel 44 by performing disassembly using another method. Furthermore, it is unnecessary to disassemble reel 44 when a configuration is adopted in which reel 44 can be detached without disassembling reel 44 (for example, a configuration in which only one side plate 45 of reel 44 is provided, and winding core 46 extends from one side plate 45 in a cantilevered state such that roll body 27R can be separated from reel 44 if roll body 27R is removed from winding core 46). Furthermore, the specific configuration of roll body extractor 63 illustrated in the above-described exemplary embodiment is merely an example, and the configuration is arbitrary as long as roll body 27R can be extracted from the holding body such as reel 44 that holds carrier tape 27 storing component BH in the state of roll body 27R and be stored in case 42.

INDUSTRIAL APPLICABILITY

Provided are the component management device and the component management method capable of stocking and taking out components easily and efficiently.

REFERENCE MARKS IN THE DRAWINGS

4 storage warehouse
27 carrier tape
27R roll body
41 encased roll body
42 case
42M radio tag (storage unit)
43 reel-equipped roll body
44 reel (holding body)
63 roll body extractor
65 reading unit (component information acquisition unit)
66 writing unit
82 shelf (storage)
82S storage position
85 case transfer mechanism
90 contactless reader (identification information reading unit)
94 information manager
94a first information manager
94b second information manager
94c identification information generator
94d storage position information generator
100 component management device
BH component

The invention claimed is:

1. A component management device comprising:
   a roll body extractor configured to extract roll bodies from holding bodies that hold carrier tapes storing components, and store the roll bodies in cases each having a read-write tag;
   a component information acquisition unit configured to read a label attached to each of the holding bodies and acquire component information that is information on one component among the components;
   an identification information generator configured to generate identification information that is used to discriminate the one component from other components among the components, the other components housed in cases other than a case in which the one component is housed;
   a writing unit configured to write the component information acquired by the component information acquisition unit and the identification information into the read-write tag of the case;
   a storage warehouse that includes a storage including a plurality of storage positions for storing the cases, a case transfer mechanism configured to transfer the cases to the plurality of storage positions, and an identification information reading unit that reads the identification information written in the read-write tag of the case;

a first information manager configured to store the component information and the identification information written in the read-write tag of the case a storage position information generator configured to specify a storage position among the plurality of storage positions and generate storage position information; and a second information manager configured to store the storage position information generated by the storage position information generator and the identification information read by the identification information reading unit in association with each other, wherein the case transfer mechanism transfers the case to the storage position based on the storage position information.

2. The component management device according to claim 1, wherein the component information acquisition unit reads and acquires the component information recorded in a radio tag as the label attached to each of the holding bodies.

3. The component management device according to claim 1, wherein the component information includes at least one of a type of the component, a component name, a characteristic, a date of manufacture, a manufacturer, an expiration date, a quantity of the component, and access information for accessing information on the type of the component, the component name, the characteristic, the date of manufacture, the manufacturer, the expiration date, the quantity of the component.

4. A component management method for a component mounting system that includes: a roll body extractor configured to extract roll bodies from holding bodies that hold carrier tapes storing components and store the roll bodies in cases each having a read-write tag; a storage warehouse that includes a storage unit including a plurality of storage positions for storing the cases and a case transfer mechanism configured to transfer the cases to the plurality of storage positions; a first information manager; a second information manager, an identification information generator, a writing unit, a reading unit, and a storage position information generator, the component management method comprising:

acquiring component information that is information on one component among the components by the first information manager;

generating identification information that is used to discriminate the one component from other components among the components by the identification information generator, the other components housed in cases other than a case in which the one component is housed;

writing the component information and the identification information into the read-write tag of the case by the writing unit;

storing the component information and the identification information written in the read-write tag of the case in the first information manager;

reading the identification information written in the read-write tag of the case by the reading unit;

specifying a storage position corresponding to the case among the plurality of storage positions and generating storage position information by the storage position information generator;

storing the storage position information and the identification information in the second information manager; and transferring the case to the storage position based on the storage position information by the case transfer mechanism.

5. The component management method according to claim 4, wherein, in the acquiring the component information includes reading a label attached to each of the holding bodies and acquiring the component information recorded in a radio tag as the label.

6. The component management method according to claim 4, wherein the component information includes at least one of a type of the component, a component name, a characteristic, a date of manufacture, a manufacturer, an expiration date, a quantity of the component, and access information for accessing information on the type of the component, the component name, the characteristic, the date of manufacture, the manufacturer, the expiration date, the quantity of the component.

7. A component management method for a component mounting system that includes: a roll body extractor configured to extract roll bodies from holding bodies that hold carrier tapes storing components and store the roll bodies in cases each having a read-write tag; and a case transfer mechanism configured to transfer the cases to a plurality of storage positions in a storage warehouse; the component management method comprising:

generating identification information that is used to discriminate one component from other components among the components, the other components housed in cases other than a case in which the one component is housed;

writing the identification information into the read-write tag of the case;

reading the identification information written in the read-write tag of the case;

specifying a storage position corresponding to the case among the plurality of storage positions and generating storage position information; and transferring the case to the storage position based on the storage position information.

* * * * *